United States Patent
Ehrlacher

(10) Patent No.: US 9,491,445 B2
(45) Date of Patent: Nov. 8, 2016

(54) LENTICULAR DIRECTIONAL DISPLAY

(75) Inventor: Edward Alex Ehrlacher, Philadelphia, PA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/263,417

(22) PCT Filed: May 5, 2011

(86) PCT No.: PCT/US2011/035339
§ 371 (c)(1),
(2), (4) Date: Oct. 7, 2011

(87) PCT Pub. No.: WO2012/150940
PCT Pub. Date: Nov. 8, 2012

(65) Prior Publication Data
US 2014/0043452 A1 Feb. 13, 2014

(51) Int. Cl.
*H04N 13/04* (2006.01)
*G02B 27/22* (2006.01)

(52) U.S. Cl.
CPC ...... *H04N 13/0445* (2013.01); *G02B 27/2214* (2013.01); *H04N 13/0404* (2013.01)

(58) Field of Classification Search
CPC ......... G02B 27/2214; H04N 13/0404; H04N 13/0445
USPC ...................... 345/419; 348/54, 59
See application file for complete search history.

(56) References Cited

U.S. PATENT DOCUMENTS 5,715,383 A * 2/1998 Schindler et al. ............ 345/419
6,377,295 B1 4/2002 Woodgate et al.
6,701,250 B1 3/2004 Rychlak
7,342,721 B2 * 3/2008 Lukyanitsa ................... 359/462

(Continued)

FOREIGN PATENT DOCUMENTS

CN 1744724 A 3/2006
CN 101321218 A 12/2008

(Continued)

OTHER PUBLICATIONS

Liu et al. "CN 101668219A Full Translated Text". Published Mar. 2010. 51 total pages.*

(Continued)

*Primary Examiner* — Christopher S Kelley
*Assistant Examiner* — Zhihan Zhou
(74) *Attorney, Agent, or Firm* — Brundidge & Stanger, P.C.

(57) ABSTRACT

Technologies are generally described herein for lenticular directional displays having an image source layer and a directional layer. A control system can be configured to execute various methods for obtaining first content and second content, the first content being associated with a first viewpoint and the second content being associated with a second viewpoint. The control system can also display the first content and the second content at the image source layer adjacent to the directional layer such that the first content is visible at the first viewpoint and the second content is visible at the second viewpoint. The control system can determine that the first viewpoint or the second viewpoint has changed relative to the display, and modify at least one of the first content or the second content in response to determining that the first viewpoint or the second viewpoint has changed.

26 Claims, 11 Drawing Sheets

(56) References Cited

U.S. PATENT DOCUMENTS

| | | | |
|---|---|---|---|
| 7,518,664 B2 | 4/2009 | Mather et al. | |
| 7,580,186 B2 | 8/2009 | Mather et al. | |
| 2004/0046885 A1* | 3/2004 | Regan et al. | 348/333.11 |
| 2006/0031917 A1* | 2/2006 | Winder et al. | 725/135 |
| 2006/0050385 A1* | 3/2006 | Uehara et al. | 359/465 |
| 2007/0058258 A1 | 3/2007 | Mather et al. | |
| 2007/0126884 A1* | 6/2007 | Xu | G06K 9/00221 348/220.1 |
| 2008/0303842 A1 | 12/2008 | Okamoto et al. | |
| 2009/0089833 A1* | 4/2009 | Saito | H04H 60/33 725/38 |
| 2009/0262194 A1* | 10/2009 | Wakefield et al. | 348/157 |
| 2009/0273721 A1* | 11/2009 | Dhuey | 348/790 |
| 2010/0177172 A1 | 7/2010 | Ko et al. | |
| 2010/0182688 A1 | 7/2010 | Kim et al. | |
| 2010/0238097 A1 | 9/2010 | Baik et al. | |
| 2010/0238264 A1* | 9/2010 | Liu et al. | 348/14.13 |
| 2010/0302136 A1* | 12/2010 | Arcuri | 345/156 |
| 2011/0043142 A1 | 2/2011 | Travis et al. | |
| 2011/0090311 A1* | 4/2011 | Fang et al. | 348/43 |
| 2011/0102423 A1* | 5/2011 | Nam et al. | 345/419 |
| 2011/0150101 A1* | 6/2011 | Liu et al. | 375/240.26 |
| 2011/0157339 A1* | 6/2011 | Bennett et al. | 348/59 |
| 2011/0267437 A1* | 11/2011 | Abeloe | 348/51 |
| 2011/0316963 A1* | 12/2011 | Li et al. | 348/14.1 |
| 2013/0033586 A1* | 2/2013 | Hulyalkar | 348/51 |

FOREIGN PATENT DOCUMENTS

| | | | |
|---|---|---|---|
| CN | 101668219 A | * | 3/2010 |
| CN | 101754042 A | | 6/2010 |
| CN | 101840073 A | | 9/2010 |
| JP | 9-101749 | | 4/1997 |
| JP | 10115800 A | | 5/1998 |
| JP | 10-174127 | | 6/1998 |
| JP | 2002010293 A | | 1/2002 |
| JP | 2002244079 A | | 8/2002 |
| JP | 2006-276692 | | 10/2006 |
| JP | 2008-070760 | | 3/2008 |
| JP | 2008-276495 | | 11/2008 |
| JP | 2007-304656 | | 12/2008 |

OTHER PUBLICATIONS

"JP2009-164977 Translation". Jul. 2009.*
International Search Report and Written Opinion dated Sep. 21, 2011 in PCT Application No. PCT/US11/35339.
Strickland, Jonathan. "How 3-D TV Works" Jun. 23, 2009. HowStuffWorks.com. <http://electronics.howstuffworks.com/3d-tv.htm> Sep. 26, 2011.
Lincoln, Peter, et al., "Multi-View Lenticular Display for Group Teleconferencing," Immerscom 2009, May 27-29, 2009, Berkley, USA.

* cited by examiner

LENTICULAR DIRECTIONAL DISPLAY

BACKGROUND

Unless otherwise indicated herein, the materials described in this section are not prior art to the claims in this application and are not admitted to be prior art by inclusion in this section.

The use of display devices has proliferated recently with the introduction of various new display technologies. In particular, as the cost of display devices has decreased, the popularity of display devices has surged. Meanwhile, the amount of available content for display on display devices has also surged. For example, hundreds of channels of content are often available to users, as are multiple gaming platforms, applications, and the like.

Additionally, large displays may be used by a group of viewers at a particular time. Viewers may have varied interests, and as such may want to view varied types of content. Most display devices, however, are incapable of concurrently displaying various types of content at any given time. Although some display devices may be capable of concurrently displaying varied content, such display devices may require the use of expensive and bulky glasses or other hardware to enable use of these features.

Similarly, with the decreased price of display devices, display devices are often used in public places for personal and/or business use. Viewers may wish to restrict the visibility of the display. While privacy screen or reflective coatings and the like can reduce the visibility of the display from certain angles, these and other types of treatments and/or coatings may be ineffective in low light conditions or other situations.

SUMMARY

The present disclosure generally describes concepts and technologies for displaying content on lenticular directional display devices ("directional display devices"). According to various embodiments of the concepts and technologies disclosed herein, content is displayed onto or by directional display devices that include a directional layer adjacent or proximate to an image source layer. A control system associated with the directional display device is configured to obtain one or more instances of content. Each of the one or more instances of content can be associated with one or more viewers, viewpoints, locations, directions, and/or other entities. The control system is configured to collect the various instances of content and to generate composite content that includes the one or more instances of content for simultaneous display at the image source layer of the directional display device.

In some embodiments, the control system is configured to slice, divide, section, and/or otherwise separate each of the instances of content into rows, columns, or other sections. The control system combines the various rows, columns, or other sections of the instances of content, along with other information, if desired, into a single instance of content referred to herein as "composite content." The control system is configured to output the composite content for display at the image source layer. In some embodiments, the directional layer is configured to bend, skew, warp, redirect, and/or otherwise modify the composite content displayed by the image source layer such that the respective rows, columns, or other sections of the instances of content are directed to the viewers, viewpoints, locations, directions, or other entities associated with the various sections.

In some implementations, the directional display devices further include or are in communication with a tracking system configured to track viewers and/or devices associated with the viewers. The tracking system can include one or more or a combination of optical sensors, radio-frequency-based sensors, visible and/or invisible light transmitters and sensors, proximity sensors, pressure sensors, cameras, and/or other devices for tracking movement of viewers and/or devices associated with the viewers. The tracking system can also include various other active or passive sensors for monitoring positioning and movements of the entities and/or for communicating with devices associated with the entities. In some implementations, one or more devices associated with the viewers are configured to track movements of the viewers, and the tracking system is configured to communicate with and/or monitor the devices to obtain or determine information indicating movements of the viewers. Thus, the tracking system can generate or otherwise maintain tracking data reflecting the tracked position, orientation, movement, and/or identity of the viewers and/or devices associated with the viewers, and provide or allow access of the tracking data to or by the control system.

The control system can analyze or monitor the tracking data to determine if a viewer, a device associated with the viewer, and/or a viewpoint associated with the viewer has moved based, at least partially, upon the tracking data. If the control system determines that the viewer, the device, and/or the viewpoint associated with the viewer has moved or changed, the control system can modify the composite content that corresponds to the one or more instances of content as well as other information, and output the composite content to the directional display device for display. As such, the directional display device can display multiple instances of content to multiple viewers at any particular time, while allowing or maintaining privacy between the displayed images, if desired, even when viewers and/or their associated viewpoints move or change with respect to the directional display devices and/or one another.

An example directional display device can be configured to display first content and second content on an image source layer adjacent a directional layer. The directional display device can communicate with or include a control system. The control system may be configured to perform methods for displaying content on the directional display device. Some example methods may include obtaining the first content and the second content, the first content being associated with a first viewpoint and the second content being associated with a second viewpoint, and displaying the first content and the second content at the image source layer adjacent to the directional layer such that the first content is visible at the first viewpoint and the second content is visible at the second viewpoint. The example methods further can include determining that the first viewpoint or the second viewpoint has changed relative to the display, and modifying at least one of the first content or the second content in response to the determining. The present disclosure generally also describes computer storage media for storing instructions executable by computers to provide various methods, including the example methods disclosed herein for displaying content on the directional display device.

The present disclosure generally also describes an example apparatus for displaying content on the directional display device. Some example apparatus include an image source layer for displaying the first content and the second content, the first content being associated with a first viewpoint and the second content being associated with a second viewpoint. The example apparatus can also include a directional layer adjacent to the image source layer, the directional layer including one or more lenticular elements for directing the first content to the first viewpoint and the second content to the second viewpoint. The apparatus further can include a tracking system configured to determine that the first viewpoint or the second viewpoint has changed relative to the display, and a control system configured to obtain the first content and the second content and modify at least one of the first content or the second content in response to the determination that the first viewpoint or the second viewpoint has changed relative to the display.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
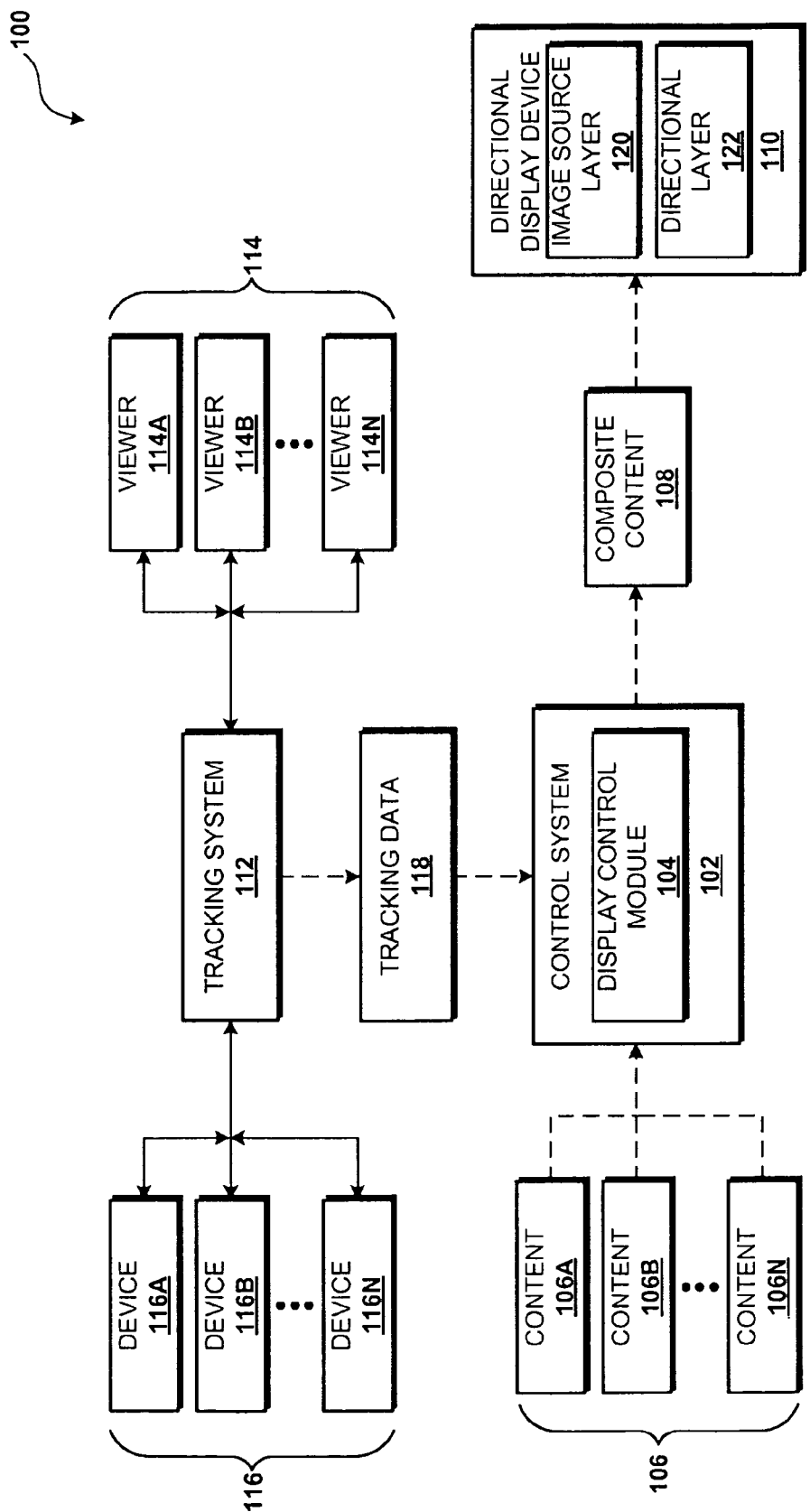
FIG. 1 is a system diagram illustrating a system for displaying content on a directional display device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGURES, can be arranged, substituted, combined, separated, and designed in a wide variety of different configurations, all of which are explicitly contemplated herein.

This disclosure is generally drawn, inter alia, to displaying content on a lenticular directional display device ("display" or "directional display device"). In an illustrative example, a directional display device includes an image source layer and a directional layer. A control system associated with or in communication with the directional display device is configured to receive one or more instances of content. The content can include, but is not limited to, static images, video, animations, device output, applications, games, text, photographs, and/or other information. The control system is also configured to associate each of the instances of content with one or more viewers.

The control system processes the instances of content to generate slices, divisions, sections, or other portions of the instances of content. The control system assembles the portions of the content into a single image referred to herein as "composite content" that includes the various portions of the various instances of the content. The composite content can also include other information corresponding to blocking pixels, text, privacy images, blank images, logos, or the like. The composite content is output by the control system to the directional display device. The directional display device displays the composite content on the image source layer, which is adjacent or proximate to the directional layer.

The directional layer includes a number of lenticular elements that are shaped and configured to redirect the image displayed by the image source layer. In some embodiments, the lenticular elements have a cross sectional shape that is curved, polygonal, and/or irregularly shaped. The composite content includes a number of columns, rows, or other sections, which can be redirected by the directional layer to a desired viewpoint or location. Thus, a number of viewers can simultaneously view different content on a single directional display device.

In some embodiments, the directional display device also includes or is in communication with a tracking system. The tracking system can track viewers or devices associated with the viewers. The tracking system can also be configured to communicate with one or more devices that are configured to report position information and/or to report data that can be used by the tracking system to determine position information associated with the devices. According to various implementations, the tracking system includes cameras, pressure sensors, optical sensors, radio-frequency-based sensors, light transmitters and sensors, proximity sensors, or other devices that can be used to obtain information for tracking movement of viewers and/or devices associated with the viewers. As such, the tracking system generates or obtains tracking data reflecting the tracked position, orientation, movement, and/or identity of the viewers and/or devices associated with the viewers, and provides tracking data to the control system.

The control system analyzes the tracking data to determine if a viewpoint associated with a viewer or device has changed. If the control system determines that the viewpoint associated with a viewer has changed, the control system is configured to modify the composite content to reflect the determined change and to output the composite content to the directional display device for display. As such, the directional display device can display multiple instances of content to multiple viewers at any particular time, while allowing or maintaining privacy between the displayed images even when viewers move and/or viewpoints associated with the viewers change with respect to the directional display devices and/or one another. These and other aspects of systems and methods for displaying content on directional display devices will be described in more detail herein.

Referring now to FIG. 1, a system diagram illustrating a system 100 for displaying content on directional display devices arranged according to at least some embodiments presented herein will be described. As will be explained in more detail herein, the system 100 can be embodied as part of a computer display, a monitor, a television set, a laptop or other mobile computing device, a mobile telephone or smartphone, or the like. The system 100 also can be embodied as a ubiquitous display that is integrated within a wall, table, counter, building, signage, furniture, and/or other surfaces of other structures. In other embodiments, one or more components of the system 100 can be embodied in a display device, while one or more other components of the system 100 can be communicatively coupled to one another via a network connection or one or more other types of connections. For purposes of explaining the various components of the system 100, the system 100 is described herein as being embodied in a display device such as a monitor or television. It should be understood that this embodiment is illustrative, and should not be construed as being limiting in any way.

The system 100 includes a control system 102. The control system 102 is configured to execute one or more application programs such as, for example, a display control module 104 and/or other application programs. Although the display control module 104 is illustrated as a component of the control system 102, it should be understood that the display control module 104 may be embodied as or in one or more stand-alone devices or components. Additionally, although not illustrated in FIG. 1, it should be understood that the display control module 104 can operate on or in communication with a network (not shown in FIG. 1), and that therefore the display control module 104 may communicate with the control system 102 via direct connections and/or via network connections.

The display control module 104 is configured to process one or more instances of content ("content") 106A-N (hereinafter also referred to collectively and/or generically as "content 106"). The content 106 can include one or more representations of two dimensional ("2D") content, three-dimensional ("3D") content, animated content, video, still images, text, photographs, slide shows, presentations, blocking pixels and/or images (described in detail below with reference to FIG. 3), other content, combinations thereof, or the like. The content 106 can be received at the control system 102 from one or more sources (not illustrated). In some embodiments, the content 106 is received from one or more sources or devices configured to transmit, stream, broadcast, multicast, output, and/or otherwise provide the content 106 to the control system 102.

According to various implementations, the control system 102 receives the content 106 via one or more wired and/or wireless connections to media players and/or other sources of the content 106. Illustrative examples of sources of the content 106 include, but are not limited to, various media playback devices such as digital versatile disk ("DVD") players, BLU-RAY disk (BD) players, video cassette recorders ("VCRs"), compact disk ("CD") players, laserdisc players, mini-disc players, or the like. Other sources of the content 106 include media storage or streaming devices such as digital video recorders ("DVRs"), memory devices, hard disk drives ("HDDs"), flash memory, or the like. The sources can also include various computing devices such as personal computers ("PCs"), smartphones, laptop computers, server computers, or the like, as well as various signal sources including, but not limited to, satellite signals, a connection to the Internet and/or other network connections, cable television sources, digital and/or analog antenna sources, set-top boxes ("STBs"), other sources, combinations thereof, or the like. It should be understood that the sources also can include any combination of virtual machines and/or other resources within a cloud computing or other environment. Thus, it should be understood that the content 106 can be received at the control system 102 via any suitable source via any number of wireless and/or wired connections or networks.

The control system 102 is configured to receive or obtain the content 106, to process the content 106, and to generate and output composite content 108 for display at a directional display device 110 in communication with and/or communicatively coupled to the control system 102. More particularly, the control system 102 is configured to generate the composite content 108, which can include the content 106, as well as other information. The control system 102 is configured to divide, section, slice, or otherwise obtain frames or portions of each of the instances of the content 106, and to display the portions of the content 106 as portions of the composite content 108. As will be explained in additional detail with reference to FIGS. 2-8, the composite content 108 can be configured for display on the directional display device 110 or other directional displays such that each of the instances of content 106A-N can be visible from a viewpoint associated with each of the instances of content 106A-N. This will be explained in additional detail below with reference to FIGS. 2-6.

The composite content 108 can also include information that, when displayed as part of the composite content 108, provides a buffer, divider, or privacy zone between the sections, divisions, slices, and/or other portions of the composite content that correspond to the respective instances of content 106A-N. The information can be, but is not necessarily, received at the control system 102 as or with one or more of the instances of content 106A-N or can be separately stored or received. In some embodiments, for example, the information includes a representation of a logo, an image, a video, text, photographs, and/or other content that is stored at or accessible by the control system 102. Thus, the control system 102 can also be configured to section or divide the information, and to include the information as part of the composite content 108.

The system 100 can also include a tracking system 112 for tracking position, movement, identity, and/or orientation of one or more users or viewers ("viewers") 114A-N (hereinafter collectively and generically referred to as "viewers 114"). In some embodiments, the tracking system 112 is configured to track position, movement, identity, and/or orientation of the viewers 114 using one or more or a combination of optical sensors, cameras, microphones or other sound sensors, radio frequency ("RF") devices, biometric information, pressure sensors, combinations thereof, or the like. It should be understood that the optical sensors and/or cameras can use visible or invisible light to allow tracking of the viewers 114 in low light conditions and/or other situations. In some implementations, positions of the viewers 114 are determined using a network of contact or pressure sensors built into a floor and/or an array of proximity sensors disposed in a floor, floor mat, or ceiling.

In yet other implementations, the tracking system 112 uses a light beam grid of source/detector pairs covering the expected viewing area near the directional display device 110, wherein the light beam grid may be used to locate the viewers 114 and track movements of the viewers 414 based on physical interruptions of the light beams detected by the source/detector pairs. The viewers 114 may also be tracked by the tracking system 112 by communicating with one or more devices 116A-N (hereinafter collectively or generically referred to as "devices 116"), associated with the viewers 114 to obtain location coordinates (e.g., global positioning system ("GPS") coordinates, or the like) determined or obtained by the devices. In some embodiments, the control system 102 and/or the tracking system 112 augments location coordinates with dead-reckoning techniques for more precise estimates of location, movement, and/or orientation of the viewers 114. The tracking system 112 can also be configured to determine location, movement, and/or orientation of the viewers 114 based upon an analysis of wireless signals received from the devices 116 as observed at a set of receivers or transceivers associated with tracking system 112.

Thus, the tracking system 112 is configured to track position, movement, identity, and/or orientation of the viewers 114 and/or devices 116 associated with the viewers 114, and to generate tracking data 118 indicating the tracked information. The tracking data 118 is obtained by the control system 102 and used to generate and/or modify the composite content 108 based upon the position, movement, identity, and/or orientation of the viewers 114. An illustrative embodiment of tracking of the viewers 114 is described in detail with reference to FIG. 2.

As will be explained in more detail herein, particularly with reference to FIGS. 2-5, the directional display device 110 illustrated in FIG. 1 can include various components including, but not limited to, an image source layer 120 and a directional layer 122. The image source layer 120 can include structure corresponding to a liquid crystal display ("LCD") surface, a plasma screen, a light emitting diode ("LED") array, a microelectrical mechanical system ("MEMS") micro mirror array, an organic LED ("OLED") display, a cathode ray tube ("CRT") display, projection displays, other types of displays, or the like. The directional layer 122 can include an array of lenticular elements for directing and/or focusing light emitted or displayed on the image source layer 120 to one or more desired locations, directions, viewpoints, or the like.

In some embodiments, the directional layer 122 includes a lenticular film having a number of lenticular elements. The lenticular elements can be shaped, sized, arranged, and/or otherwise configured based upon the size of the directional display device 110, an average expected audience or number of viewers 114, a degree of privacy expected or required among the viewers 114, probable or known viewing angles and/or distances associated with the viewers 114, combinations thereof, or the like. In some embodiments, the lenticular elements include structures or micro-structures having a cross-sectional shape that can approximate cylindrical, spherical, elliptical, parabolic, and/or other rounded shapes, portions thereof, or the like. In other embodiments, the lenticular elements have a cross-sectional shape with linear facets, and therefore can appear to resemble portions of various polygonal shapes, portions thereof, or the like. These and other embodiments of the directional layer 122 will be described in additional detail herein, particularly with reference to FIGS. 5A-5C. Thus, it should be understood that the above-described embodiments are illustrative, and should not be construed as being limiting in any way.

Although the creation of the composite content 108 has been discussed above, it should be understood that the control system 102 is also configured to determine a portion of the composite content 108 that will be presented to each of the viewers 114 based upon locations of the viewers 114 and/or the type, size, configuration, and/or other properties of the directional layer 122 and/or the lenticular elements associated therewith. For example, as illustrated in FIGS. 2-5C, the image source layer 120 can be used to present columns, rows, or other divisions of the composite content 108. Similarly, the directional layer 122 can be configured in a number of ways, some of which provide varied widths or distances for presenting the respective columns, rows, or other divisions of the composite content 108 to the respective viewers 114. Thus, the control system 102 can be configured to recognize the physical properties of the directional layer 122 as wells as positioning of the viewers 114 to determine how the composite content 108 displayed on the image source layer 120 is to be configured. As such, the control system 102 can determine, based upon the locations of the views 114 and/or the properties of the directional layer 122, how each instance of content 106 should be sectioned or otherwise divided when generating the composite content 108.

Similarly, as will be appreciated with reference to FIGS. 2-5C and the description thereof, the position or orientation of the directional layer 122 can be dynamically adjusted or changed. As a result, the control system 102 can be configured to dynamically adjust how the composite content 108 is configured, and to modify the composite content 108 based upon movements of the viewers 114, constant and/or dynamic properties of the directional layer 122, properties of the composite content 108, and/or other considerations. It therefore will be understood that the control system 102 can be aware of all aspects of the directional layer 122 as well as any changes or adjustments made to the position or orientation thereof, as well as positioning and movements of the viewers 114 to ensure that the composite content 108 is properly configured for viewing by the viewers 114.

The control system 102 can be configured by manufacturers, installers, and/or users to ensure that the control system 102 is properly configured to output composite content 108 that can be aligned with the lenticular elements of the directional layer 122. In some embodiments, a viewer 114, installer, manufacturer, or other entity may execute a setup or calibration procedure to ensure that the slices, divisions, sections, and/or other portions of the composite content 108 are viewable at respective viewpoints, as will be more clearly understood herein. Data generated during the setup, calibration, or similar procedures can be referenced by the control system 102 during generation of the composite content 108. These and other aspects of the control system 102 will be clear with reference to the FIGURES and the description thereof.

FIG. 1 illustrates one control system 102, one directional display device 110, and one tracking system 112. It should be understood, however, that some implementations of the system 100 may include multiple control systems 102, multiple directional display devices 110, and/or multiple tracking systems 112. Thus, the illustrated embodiments should be understood as being illustrative of some examples of the system 100, and should not be construed as being limiting in any way.

Figure 2:
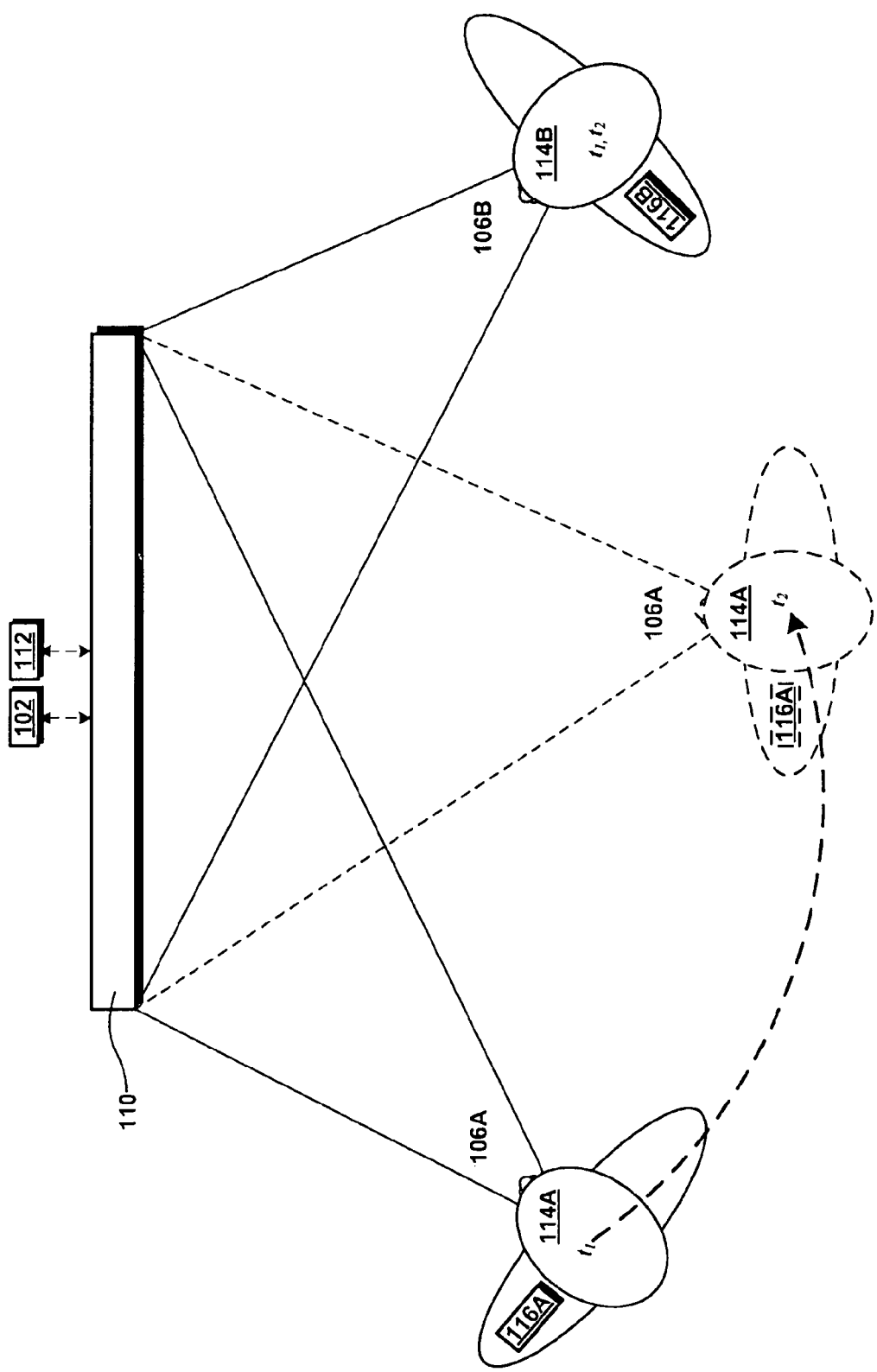
FIG. 2 is a line drawing illustrating additional aspects of displaying composite content on a directional display device.

Turning now to FIG. 2, additional aspects of displaying the composite content 108 on the directional display device 110 will be described in more detail. In particular, the directional display device 110 is illustrated in FIG. 2. Additionally, two viewers 114A, 114B are shown as viewing the directional display device 110. In the illustrated embodiment, the viewers 114A, 114B are wearing, implanted with, or carrying respective devices 116A, 116B though this need not necessarily be the case. The devices 116 can correspond to various types of active or passive devices including, but not limited to, computing devices, mobile telephones, RFID transceivers, near-field communications ("NFC") devices, other short-range RF devices, visible or invisible light emitters, other optical transmitters or transceivers, and/or any other types of device for which position, orientation, and/or movement can be determined and/or tracked.

In some embodiments, the tracking system 112 is configured to recognize the devices 116 as being associated with the viewers 114 via various methods. For example, the tracking system 112 can be configured via an automatic or manual process in which the devices 116 are registered with the tracking system 112 and/or associated with one or more instances of the content 106. Additionally, or alternatively, the tracking system 112 can be configured to associate a particular device 116 with a particular viewer 114 based upon input from other sources such as remote control devices, optical sensors, sound sensors, or the like. For example, in one embodiment, a viewer 114 holds a device 116 that will be registered with the control system 102 and also indicates to the control system 102 a desired association. In some embodiments, the association is made by holding or using a remote control, by selection of a menu option displayed by the directional display device 110 or another device, by issuing voice commands or physical gestures, or otherwise. It should be understood that these embodiments are illustrative, and should not be construed as being limiting in any way.

As explained herein, embodiments of the tracking system 112 disclosed herein can also be implemented without tracking or recognizing the devices 116. In particular, some embodiments of the tracking system 112 track movements of the viewers 114 and/or identities of the viewers 114 using facial recognition technologies, motion tracking technologies, biometric technologies, cameras, pressure and/or other proximity sensors, voice recognition technologies, infrared and/or other optical technologies, combinations thereof, or the like. As such, it should be understood that the presence and/or tracking of the devices 116 and/or associating the devices 116 with the viewers 114 as described herein is but one illustrative example of the concepts and technologies disclosed herein.

The tracking system 112 is configured to monitor the relative and/or actual position of the viewers 114A-B based upon relative and/or actual movements of the viewers 114A-B, and/or based upon relative and/or actual movements of the devices 116A-B, respectively. In the illustrated embodiment, at a first time $t_1$, the viewer 114A is associated with and is viewing one or more portions of the composite content 108 that individually or collectively correspond to the content 106A. At a second time $t_2$, the viewer 114A moves from a position associated with the first viewpoint to a position associated with a second viewpoint. A the first time $t_1$ through the second time $t_2$, the viewer 114B, who is associated with the content 106B, remains substantially stationary at a third viewpoint.

Thus, at the first time $t_1$, the viewer 114A is able to view a portion of the composite content 108 corresponding to the content 106A at the first viewpoint. Meanwhile, at the third viewpoint, the viewer 114B is able to view a portion of the composite content 108 corresponding to the content 106B. When the viewer 114A moves from the first viewpoint to the second viewpoint, the tracking system 112 detects movement of the viewer 114A, for example by detecting movement of the viewer 114A and/or by detecting movement of the device 116A. The control system 102 obtains the tracking data 118 generated by the tracking system 112, and modifies the composite content 108 taking into account movement of the viewer 114A.

The control system 102 modifies the composite content 108, and shifts a portion or portions of the composite content 108 corresponding to the content 106A such that the portion of the composite content 108 corresponding to the content 106A is visible at the second viewpoint instead of or in addition to, the first viewpoint. It therefore can be understood that embodiments of the concepts and technologies disclosed herein, can allow the viewers 114A-B to not only view different information, but also to continue viewing different information during and after movements tracked by the tracking system 112. These and additional aspects of the concepts and technologies disclosed herein will be described in more detail below with reference to FIGS. 3A-8.

Figure 3A:
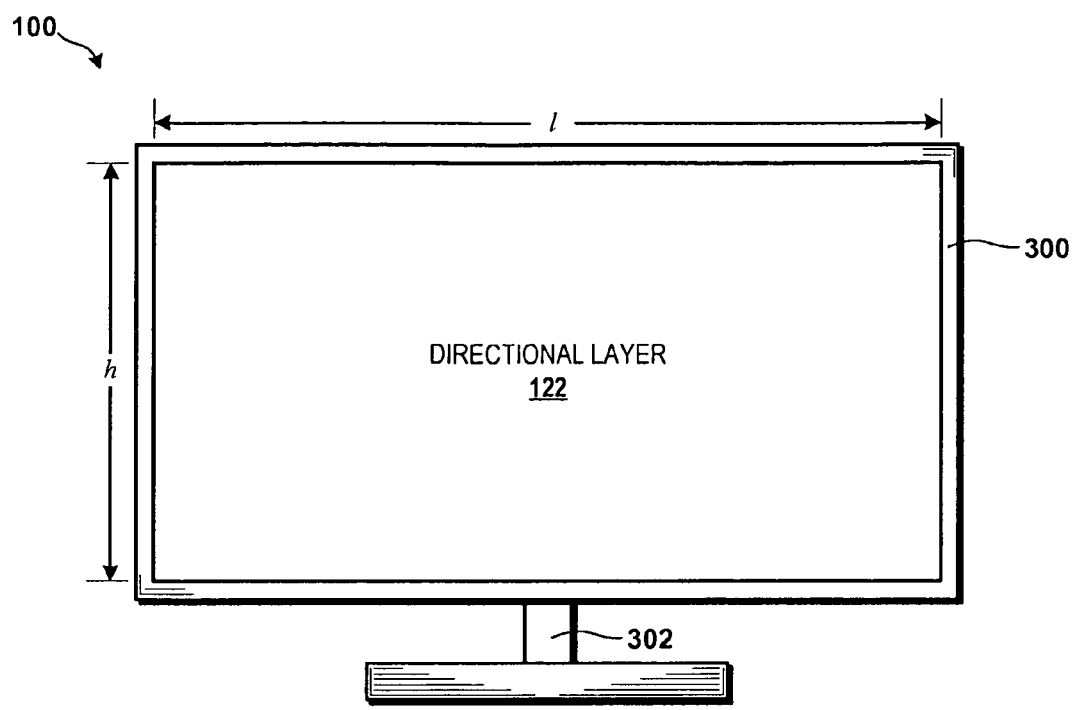
FIGS. 3A-3B are line drawings illustrating plan views of the directional display device.
Figure 3B:
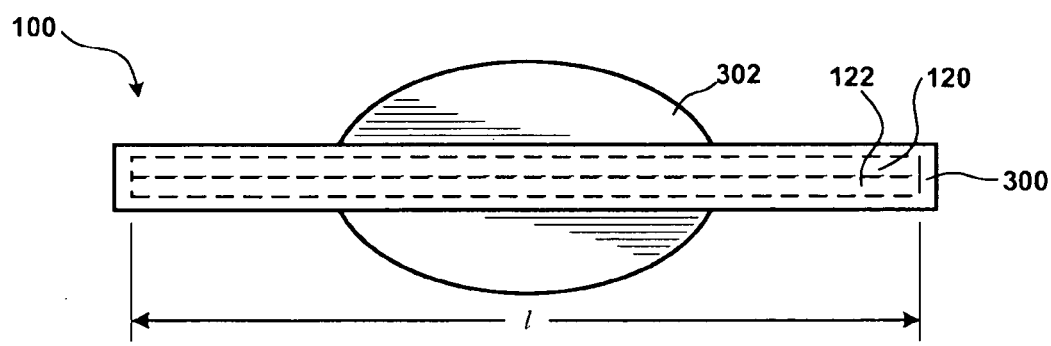

Turning now to FIGS. 3A-3B, additional aspects of the directional display device 110 arranged according to at least some embodiments presented herein will be described. In particular, FIG. 3A is a line drawing illustrating a front plan view of the directional display device 110, and FIG. 3B is a top plan view of the directional display device 110. As shown in FIGS. 3A-3B, a display area of the directional display device 110 can correspond to a display area of the image source layer and/or the directional layer 122, which is illustrated as having a length l and a height h. When the directional display device 110 is viewed from a point in front of the directional display device 110, such as the view illustrated in FIG. 3A, the directional layer 122 can be visible and exposed. The image source layer 120 can be located behind the directional layer 122, relative to a point in front of the directional display device 110 as is easiest seen in FIG. 3B. Because the directional layer 122 can be provided by a translucent or transparent material, the image source layer 120 may be visible from the front of the directional display device 110, although the image source layer 120 may not be exposed.

The directional display device 110 can include a frame 300 onto or in which the image source layer 120 and/or the directional layer 122 are located or mounted. The directional display device 110 can also include a base or stand 302 for supporting the directional display device 110. In some embodiments, the directional display device 110 includes additional or alternative hardware for mounting the directional display device 110 at or on any suitable structure including, but not limited to, a wall, furniture, or the like. In other embodiments, the display device 110 is not mounted in or on any structure, and instead is a wall or other surface of a structure such as a building, furniture, display, signage, wall, or the like. Thus, the illustrated embodiments should be understood as being illustrative, and should not be construed as being limiting in any way.

Figure 4A:
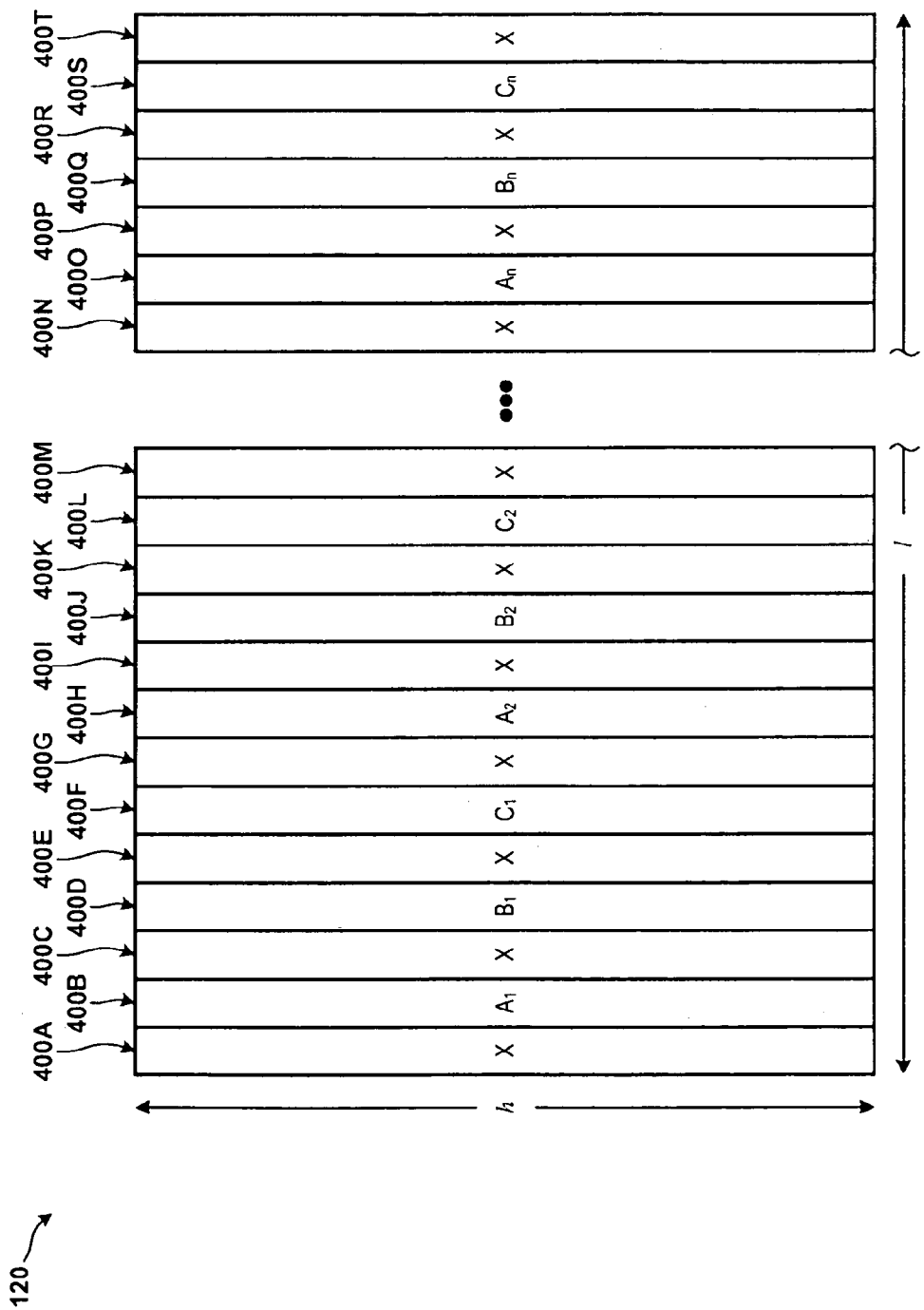
FIGS. 4A-4B are block diagrams illustrating example image source layers of a directional display device.
Figure 4B:
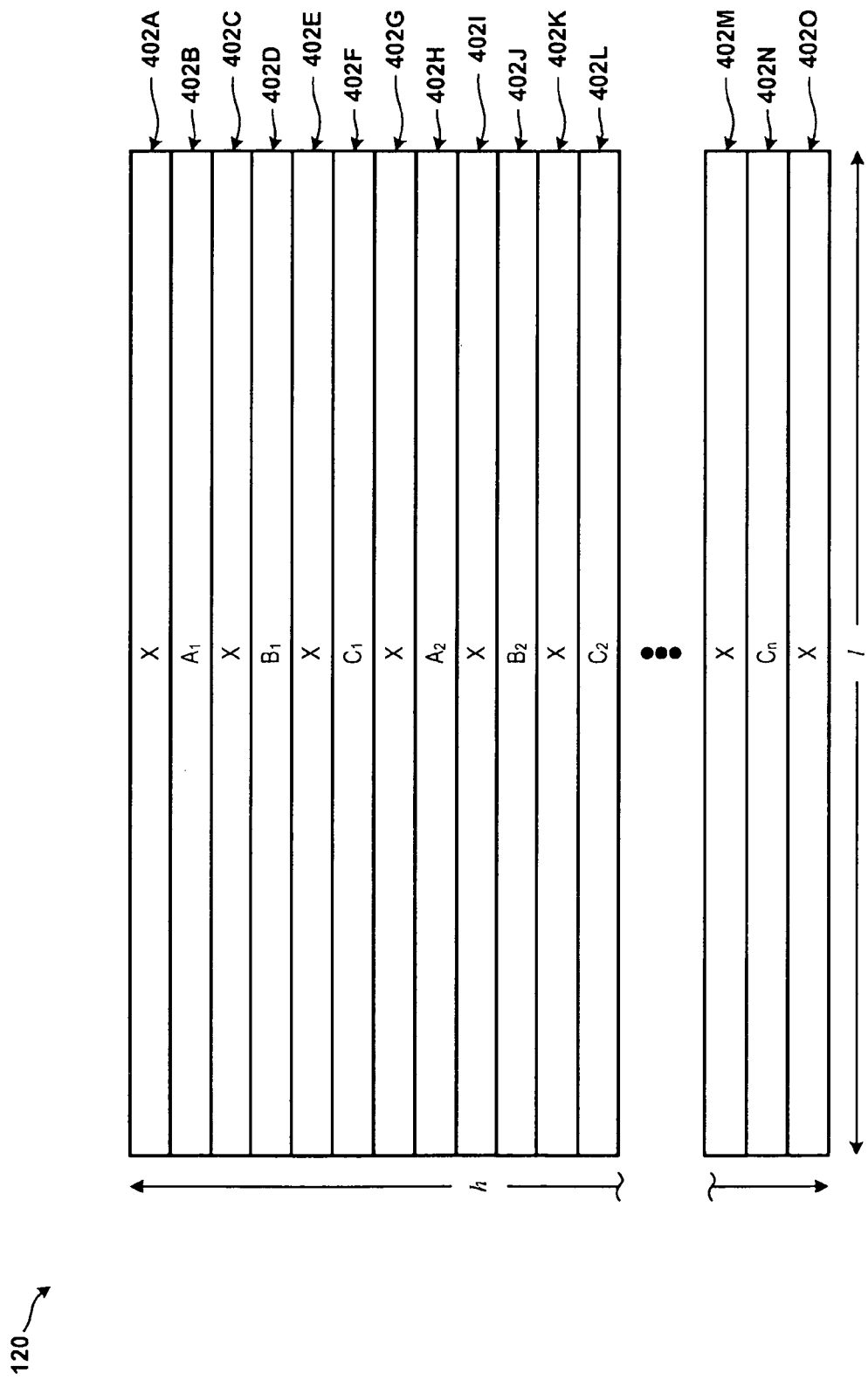

Turning now to FIGS. 4A-4B, additional details of the directional display device 110 are illustrated. In particular, FIGS. 4A-4B are block diagrams illustrating example composite content 108 displayed on an image source layer 120. The composite content 108 can include a number of columns or rows of content, illustrated as columns 400A-T (hereinafter also collectively or generically referred to as "columns 400") in FIG. 4A and rows 402A-N (hereinafter collectively or generically referred to as "rows 402") in FIG. 4B. The composite content 108 can be, but is not necessarily, configured to fill a display area of length l and height h such as the display area associated with the directional display device 110. Thus, the height of the columns 400 can be, but is not necessarily, substantially equal to or even identical to the height h of a display area of the directional display device 110 upon which the composite content 108 is configured to be displayed. Similarly, the length of the rows 402 can be, but is not necessarily, substantially equal to or even identical to the length l of a display area of the directional display device 110 upon which the composite content 108 is configured to be displayed.

In FIG. 4A, the composite content 108 includes columns 400 displaying respective portions of three instances of content 106. The columns 400 correspond to a number of divisions, sections, slices, and/or other portions of the various instances of the content 106, as well as the other information such as blocking pixels, privacy images, text, or the like, which collectively can be displayed as the composite content 108. In particular, columns 400B, 400H, and 400O correspond to respective portions of a first instance of content 106. Thus, when the columns 400B, 400H, and 400O are viewed by a viewer 114, the viewer 114 sees the content 106 that was sectioned or divided into the columns 400B, 400H, and 400O.

Similarly, columns 400D; 400J, and 400Q correspond to respective portions of a second instance of content 106, and columns 400F, 400L, and 400S correspond to respective portions of a third instance of content 106. In the illustrated embodiment, columns 400A, 400C, 400E, 400G, 400I, 400K, 400M, 400N, 400P, 400R; and 400T correspond to respective portions of other information such as a logo, a blank screen, or a fourth instance of the content 106. According to various implementations, the fourth content corresponds to blocking pixels and/or privacy images, which can be used to provide buffers or privacy zones between viewpoints associated with the other content 106.

The blocking pixels, privacy information, and/or other information displayed in the columns 400A, 400C, 400E, 400G, 400I, 400K, 400M, 400N, 400P, 400R, and 400T can be used to provide privacy to the multiple viewers 114 and/or to provide custom content to each of the viewers 114. As will be more clearly understood with reference to FIGS. 5A-5C, if a viewer 114 moves out of a defined viewpoint, the blocking pixels or other information may be visible. The number of the blocking pixels and/or the relative size, height, and/or width of the columns 400A, 400C, 400E, 400G, 400I, 400K, 400M, 400N, 400P, 400R, and 400T can be varied or adjusted by the control system 102 based upon a number of viewers 114, the types of and/or number of instances of the content 106, combinations thereof, or the like. While the columns 400 are illustrated as having uniform size, height, width, and/or other properties, it should be understood that this is not necessarily the case. In particular, some or all of the columns 400 can vary in size and/or configuration with respect to one another, if desired. As such, it should be understood that the illustrated embodiment is illustrative, and should not be construed as being limiting in any way.

In FIG. 4B, the composite content 108 includes rows 402 displaying respective portions of three instances of content 106. It will be appreciated from the description of FIG. 4A above, that the rows 402B and 402H can correspond to respective portions of a first instance of content 106, that the rows 402D and 402J can correspond to respective portions of a second instance of content 106, and that rows 402F, 402L, and 402N can correspond to respective portions of a third instance of content 106. Furthermore, it can be appreciated that the rows 402A, 402C, 402E, 402G, 402I, 402K, 402M, and 402O can correspond to respective portions of other information such as a logo, a blank screen, blocking pixels, privacy images, or a fourth instance of the content 106.

As will be described in additional detail with reference to FIGS. 5A-6, the directional layer 122 is configured to direct the images displayed in the various columns 400 and/or rows 402 to respective viewpoints. Thus, a first viewer at a first viewpoint may be able to see the first content displayed by the columns 400B, 400H, and 400O or the rows 402B and 402H, while a second viewer at a second viewpoint may be able to see the second content displayed by the columns 400D, 400J, and 400Q or the rows 402D and 402J. A third viewer at a third viewpoint may be able to see the third content displayed by the columns 400F, 400L, and 400S or the rows 402F, 402L, and 402N. Viewers at intermediate viewpoints between the three viewpoints mentioned above may be able to see the fourth content 106, blocking pixels, images, videos, other information and/or nothing. Thus, the directional display device 110 can be used to allow the simultaneous display of varied content 106 by a single directional display device 110 and/or to restrict viewing of content to users at a particular viewpoint or location.

In one contemplated usage of the concepts and technologies disclosed herein, multiple viewers in one room are able to see different types of content on the directional display device 110 based upon their respective viewpoints. In another contemplated usage of the concepts and technologies disclosed herein, the directional display device 110 is used in a museum or other setting and the composite content 108 is arranged into a number of rows 402 as shown in FIG. 4B. In a museum setting, for example, a first instance of the content 106 may be directed to a first viewpoint associated with adults, and a second version of the content 106 may be directed to a second viewpoint associated with children. As such, adult content can be provided to the adults observing the directional display device 110 from the first viewpoint, while age-appropriate and/or sensitized versions of the content 106 may be provided to the children observing the directional display device 110 from the second viewpoint.

In another contemplated embodiment of the concepts and technologies disclosed herein, the columns 400, rows 402, and/or other sections of the composite content 108 are used to present different versions of the same images to various viewers 114. For example, a group of two or more viewers may watch a movie together, and one or more of the viewers may speak different languages. Thus, in some implementations, the control system 102 is configured to present text translated into a language appropriate for each viewer 114 and to ensure that the appropriate text is displayed for the appropriate viewer 114 based upon locations of each viewer 114. According to various implementations, the columns 400, rows 402, and/or other sections of the composite content 108 can be refreshed at different rates to allow display of different types of content 106 for the various viewers 114 including, but not limited to, videos, applications, still images, or the like. It should be understood that these embodiments are illustrative, and should not be construed as being limiting in any way.

Figure 5A:
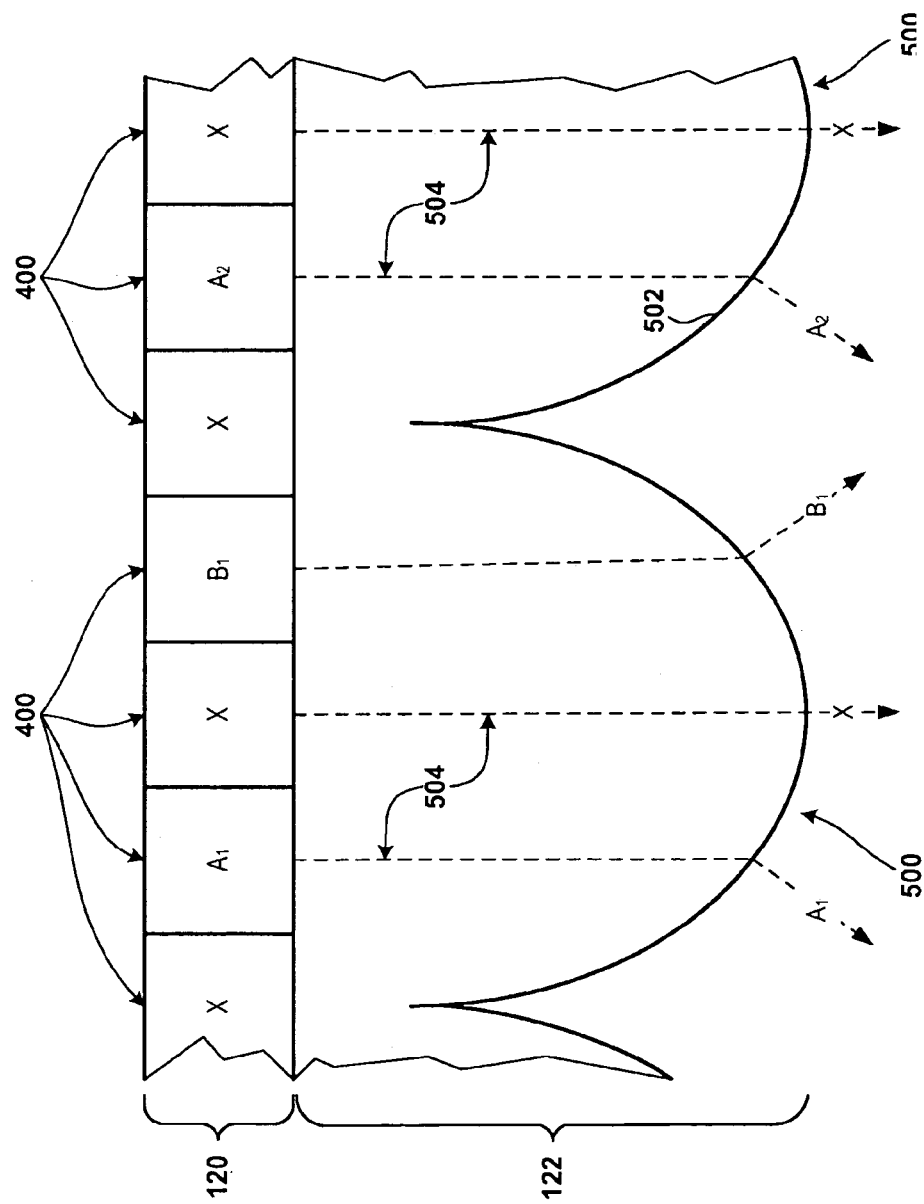
FIGS. 5A-5C are line drawings illustrating cross-section views of example portions of directional layers of a directional display device.
Figure 5B:
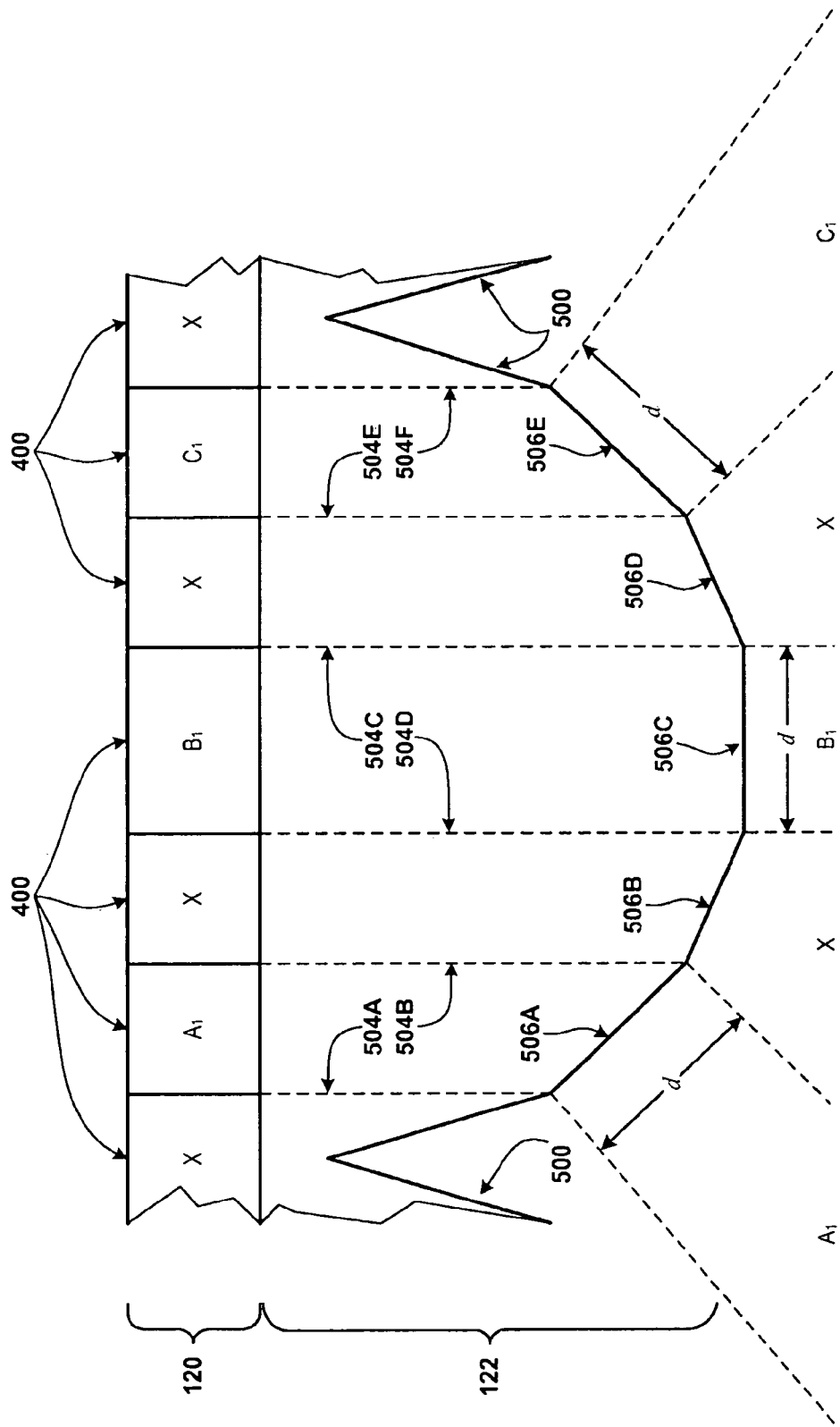
Figure 5C:
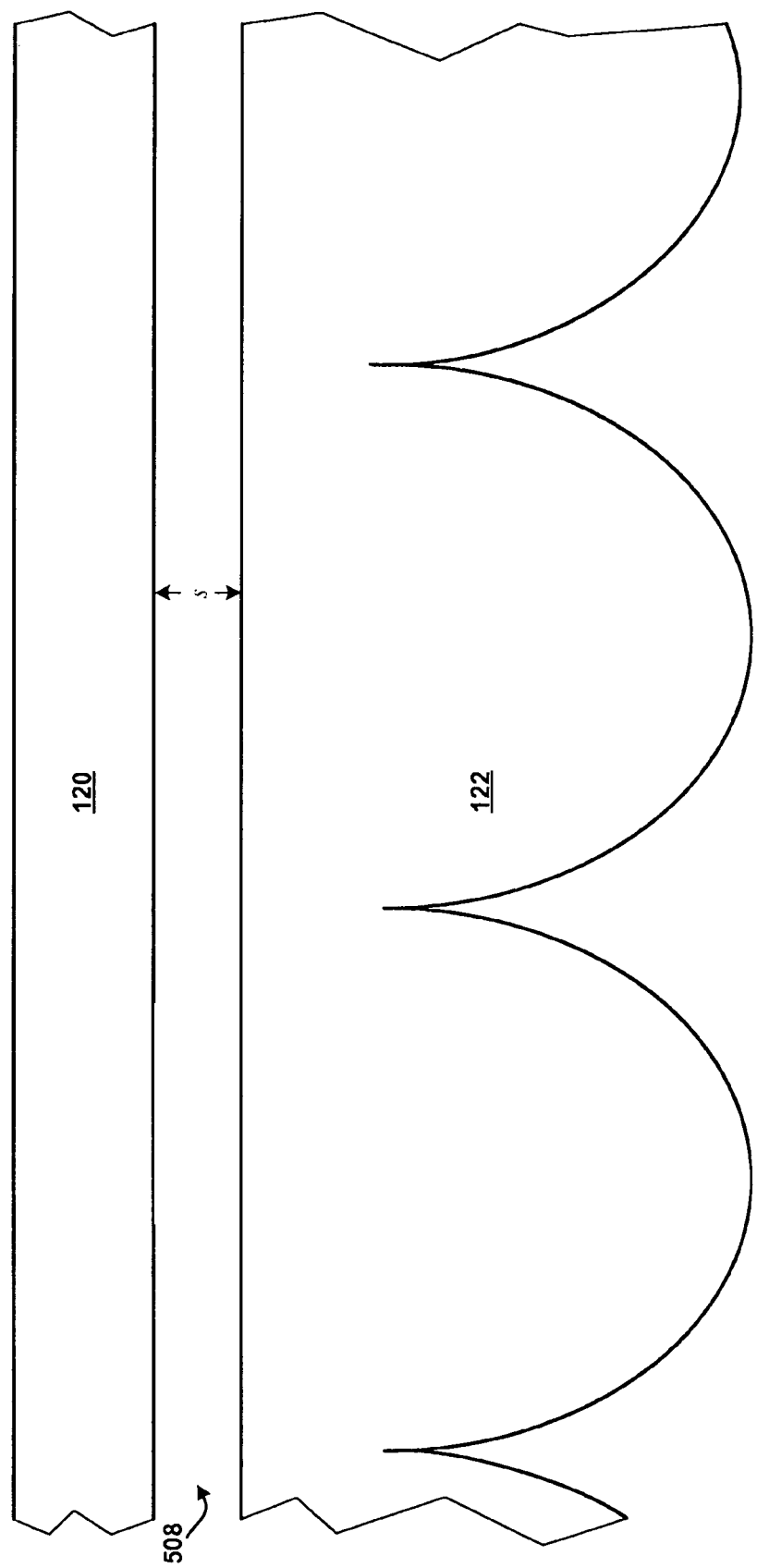

Turning now to FIGS. 5A-5C, additional aspects of the directional display device 110 will be described in detail. In particular, FIGS. 5A-5C are line drawings illustrating cross-sectional views of portions of the directional layer 122. It should be understood that the directional layer 122 can be configured to any desired size. In the embodiment illustrated in FIG. 5A, a portion of the directional layer 122 includes a number of lenticular elements 500. An exposed or visible surface 502 of the directional layer 122 can be substantially continuous, as shown. Thus, while the directional layer 122 is described as including a number of lenticular elements 500, it should be understood that the lenticular elements can be cut, formed, or otherwise obtained in or from a single piece of material, if desired. Additionally, or alternatively, the directional layer 122 can be formed from a number of lenticular elements 500 that are attached together, connected together, and/or located near one another.

View lines 504 are illustrated in FIG. 5A. The view lines 504 correspond to a direction in or from which the content 106 is projected to or viewable from a particular viewpoint. The projection of the view lines 504 can be warped, bent, redirected, and/or otherwise changed by the lenticular elements 500. As is shown in FIG. 5A, the columns 400 (or rows 402) of the composite content 108 displayed by the image source layer 120, can be viewable from or projected to different directions or viewpoints. More particularly, the column 400 labeled $A_1$ is projected to or viewable from a first direction or viewpoint, while the column 400 labeled $B_1$ is projected to or viewable from a second direction or viewpoint. From a third direction or viewpoint, the columns 400 labeled $A_1$ and $B_1$ may not be visible. Rather, in some embodiments the column 400 labeled X may be visible from the third viewpoint. It should be understood that this embodiment is illustrative, and should not be construed as being limiting in any way.

It can be appreciated from FIGS. 2 and 5A that the various columns 400 can thus be directed to a number of viewers 114 at a number of locations or viewpoints. Similarly, it can be appreciated from FIG. 5A that viewers 114 who are not within a projection or viewing area from which columns 400 labeled $A_1$, $A_2$, and/or $B_1$ are visible may instead see the columns 400 labeled X. Thus, a division or buffer for privacy or convenience can be achieved by dispersing the columns 400 labeled X between the columns 400 labeled $A_1$, $A_2$, and/or $B_1$. As noted above, structures similar to those illustrated in FIG. 5A can be used to project the rows 402 instead of, or in addition to, the columns 400.

Turning now to FIG. 5B, another embodiment of the directional layer 122 is illustrated. The lenticular elements 500 of the directional layer 122 can include a number of facets 504A-E (collectively and/or generically referred to herein as "facets 504"). The facets 504 can have substantially planar surfaces, and as such, the lenticular elements 500 can have a polygonal cross sectional shape. In some embodiments, the facets 504, and therefore the directional layer 122, are used to redirect images associated with the columns 400 of the composite content 108 displayed by the image source layer 120.

In the illustrated embodiment, the column 400 labeled $A_1$ can be projected to or viewable from a first direction or viewpoint, the column 400 labeled $B_1$ can be projected to or viewable from a second direction or viewpoint, and the column 400 labeled $C_1$ can be projected to or viewable from a third viewpoint. From third and fourth directions or viewpoints, the columns 400 labeled $A_1$, $B_1$, and $C_1$ are not visible, and instead the columns 400 labeled X may be visible. It should be understood that this embodiment is illustrative, and should not be construed as being limiting in any way.

In some embodiments, the facets 504 are used to provide linear edges for defining divisions between viewpoints. Some embodiments of the facets 504 can be used to reduce warping or other visual distortions near the boundaries defined by the view lines 502 that can be introduced, in some instances, by curved edges of the lenticular elements 500. The size of the columns 400, relative to one another, can be varied based upon the type and configuration of the directional layer 122. For example, the column 400 labeled $B_1$ can have a linear width that is greater than a linear width of the columns 400 labeled $A_1$ and/or $C_1$, though the respective distances d between the sets of view lines 504A and 504B, 504C and 504D, and 504E and 504E can be substantially equal to one another due to optical distortions introduced by the directional layer 122, if desired. Thus, in preparing the composite content 108 for display, the control system 102 can skew, warp, stretch, and/or otherwise modify content 106 based upon known characteristics of the directional layer 122. As mentioned herein, it should be noted that the size and configuration of the columns 400, rows 402, and/or other portions of the composite content 108 can be adjusted to account for known characteristics of the directional layer 122.

It should be understood that the embodiment illustrated in FIG. 5B can be used to allow viewing of the composite content 108, or portions thereof, from static viewpoints, but may also be used to disallow fluid transitions of the composite content 108 as a viewer 114 or device 116 moves relative to the directional layer 122. More particularly, it should be understood that dynamically modifying the composite content 108 as described herein can include activating and/or deactivating display of the composite content 108 by the columns 400 instead of shifting one or more portions of the composite content 108 from one column 400 to another column 400 as a viewpoint changes or moves. As such, the embodiment illustrated in FIG. 5B can be used to provide clearly defined divisions between the portions of the composite content 108, which can be used to provide privacy for viewers 114 and/or for other purposes as described herein in detail.

Turning now to FIG. 5C, another embodiment of the directional layer 122 is illustrated. As shown in FIG. 5C, some embodiments of the directional display device 110 include a gap 508 between the image source layer 120 and the directional layer 122. According to various embodiments, the size or depth s of the gap 508 can be varied by the control system 102 to adjust the spacing between the directional layer 122 and the image source layer 120 among other aspects of the directional display device 110. The size s of the gap 508, for example the distance between the directional layer 122 and the image source layer 120, can be varied by any suitable means including, but not limited to, piezoelectric actuators or films, pressurization and/or depressurization of air, gas, liquid, and/or other fluid in a cavity corresponding to the gap 508, and/or other structures and/or materials. Adjustment of the size s of the gap 508 can be used, for example, to vary the directional layer 122 focus of the composite content 108 as viewable on the directional display device 110 by viewers 114.

Thus, the size s of the gap 508 can be set to a first value to accommodate a distance between the directional layer 122 and a viewpoint. At the first value, the focus of the directional layer 122 display device 110 may be, for example, at ten feet. Thus, one or more viewers 114 in the line of sight of the viewpoint may be able to see the content associated with that line of sight. Viewers 114 who are closer than ten feet to the directional display device 110 and/or farther than ten feet from the directional display device 110, however, may not be able to clearly view the composite content 108 as images corresponding to the composite content 108 may be out of focus. Viewers 114 at or near ten feet from the directional display device 110, however, may be able to clearly see the composite content 108 displayed by the directional display device 110.

In some embodiments of the concepts and technologies disclosed herein, the size s of the gap 508 can be dynamically adjusted by the control system 102 based upon the tracking data 118 and/or other information. Thus, for example, if a viewer 114 or other entity associated with a viewpoint moves toward or away from the directional display device 110 within a viewing angle associated with a particular viewpoint, the control system 102 can adjust the size s of the gap 508 from a first value to a second value. As mentioned above, the first value can correspond, for example, to ten feet. A second value can correspond to, for example, twenty feet. Thus, viewers 114 in the line of sight of the viewpoint at the set focal length of ten feet or twenty feet may be able to see the content 106 associated with that line of sight, but the image may be out of focus for other viewers 114 within the line of sight of the viewpoint who are outside the set focal length at a particular time, for example, ten feet or twenty feet. It should be understood that this embodiment is illustrative, and should not be construed as being limiting in any way.

While the above embodiments of the directional layer 122 have been described as being used to display columns 400 or rows 402 of composite content 108, it should be understood that other embodiments are possible and are contemplated. In particular, as mentioned above, the directional layer 122 can be configured to include a number of lenticular elements 500 that have a spherical or hemispherical shape. As such, the composite content 108 can include a number of content blocks that are displayed by various portions of the lenticular elements 500. Thus, for example, composite content 108 associated with four viewpoints can be provided with four content blocks in a grid configuration separated by blocking pixels, wherein each of the four content blocks is projected by a portion of a lenticular element 500. As such, the portions of the composite content 108 can be separated based upon movement along two dimensions such as, for example, horizontally and/or vertically. It should be understood that this embodiment is illustrative, and should not be construed as being limiting in any way.

It also should be understood that the portions, slices, or other divisions of the content 106 can be adjusted, skewed, or otherwise modified individually before combination into the composite content 108 and/or collectively after the composite content 108 is generated. Thus, the slices, divisions, or other portions of the content 106 and/or the composite content 108 can be modified to compensate for changes anticipated or known to be induced by the directional layer 122.

Figure 6:
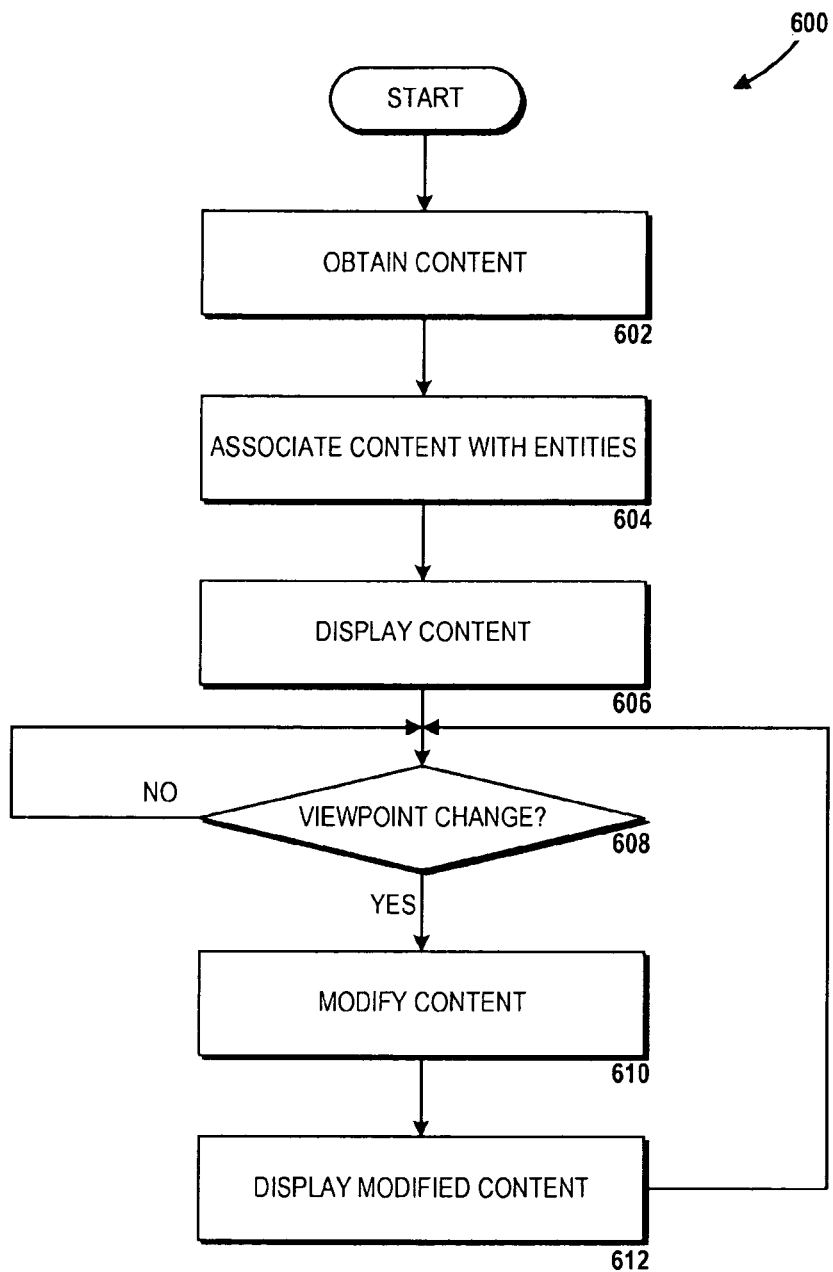
FIG. 6 is a flow diagram illustrating an example process for displaying composite content on a directional display device.

Turning now to FIG. 6, a flow diagram illustrating an example process 600 for displaying composite content on a directional display device arranged according to at least some embodiments presented herein will be described. It should be understood that the operations of the process 600 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated process 600 can be ended at any time and need not be performed in its entirety. Some or all operations of the process 600, and/or substantially equivalent operations, can be performed by execution of computer-readable instructions included on a computer storage media, as defined herein. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like.

For purposes of illustrating and describing the concepts of the present disclosure, the process 600 is described as being performed by the control system 102. It should be understood that this embodiment is only an example, and should not be viewed as being limiting in any way. Furthermore, as explained above with reference to FIG. 1, the control system 102 can execute one or more applications including, but not limited to, the display control module 104 to provide the functionality described herein.

The process 600 begins at operation 602 (obtain content), wherein the control system 102 obtains content 106 from one or more sources of the content 106. As explained above, the content 106 can include static or animated content, and the source can correspond to almost any type of device or source associated with the content 106. As such, it should be understood that the content 106 can be transmitted to the control system 102, can be broadcast to any number of devices including the control system 102, and/or otherwise can be made accessible to the control system 102. Thus, the operation 602 can include receiving the content 106, downloading or accessing one or more streams of data corresponding to the content 106, retrieving the content 106 from one or more types of media, and/or otherwise obtaining the content 106. While not illustrated in FIG. 6, it should be understood that the control system 102 also can detect and/or identify viewers 114 and determine what content 106, if any, to retrieve or obtain for the detected and/or identified viewers 114. As such, obtaining the content 106 can include detecting or identifying viewers 114, determining what content 106 to obtain, and obtaining the content 106.

From operation 602, the process 600 proceeds to operation 604 (associate content with entities), wherein the control system 102 associates the content 106 received in operation 602 with one or more entities. According to various implementations, the entities include one or more viewers 114, one or more devices 116, and/or one or more viewpoints, as explained above with reference to FIGS. 1-5C. Although not illustrated in FIG. 6, it should be understood that the control system 102 can, in addition to receiving the content 106, obtain tracking data 118 indicating a position, orientation, movement, and/or identity of one or more entities, information associating the entities with the content 106, and/or other information such as blocking pixels, logos, images, or the like for display with the one or more instances of the content 106. Thus, the control system 102 can associate each instance of content 106 received in operation 602 with one or more entities automatically or manually.

From operation 604, the process 600 proceeds to operation 606 (display content), wherein the control system 102 generates the composite content 108 and outputs the composite content 108 for display at the directional display device 110. As explained herein, the composite content 108 can be displayed in columns 400, rows 402, and/or other formats such that the instances of content 106 displayed as part of the composite content 108 can be directed to an appropriate viewer 114, viewpoint, location, and/or direction. As such, operation 606 can include dividing or sectioning the various instances of content 106 into suitable sections or divisions, inserting blocking pixels and/or other information between the various divisions or sections of the content 106, if desired, and formatting the various sections or divisions of the content 106 as well as the blocking pixels or other information into the composite content 108 formatted for display in the one or more columns 400, one or more rows 402, and/or other divisions or sections.

From operation 606, the process 60U proceeds to operation 608 (viewpoint change?), wherein the control system 102 determines if a position, orientation, location, and/or other aspect of the one or more of the viewpoints has or have changed. For example, the operation 608 can correspond to a monitoring operation wherein the control system 102 obtains or receives the tracking data 118 from the tracking system 112. The control system 102 can analyze or monitor the tracking data 118 and can determine if a viewer 114 or a device 116 associated with a viewpoint has moved or changed.

If the control system 102 determines, in operation 608, that one or more of the viewpoints have not changed, the process 600 returns to operation 608, wherein the control system 102 again determines if one or more of the viewpoints has changed. If the control system 102 determines, in operation 608, that one or more of the viewpoints have changed, the process 600 proceeds to operation 610 (modify content), wherein the control system 102 modifies the composite content 108 to reflect the change detected in operation 608.

In operation 610, the control system 102 modifies the composite content 108, for example, by varying the content, a relative size, and/or a relative position of one or more of the columns 400, by varying the content, a relative size, and/or a relative position of one or more of the rows 402, and/or by adding, removing, or modifying the blocking pixels and/or other information displayed with the content 106. In other embodiments, the operation 610 includes, in addition to or instead of modifying the composite content 108, modifications of a gap 508 between the directional layer 122 and the image source layer 120. As explained above with reference to FIG. 5C, modification of the gap 508 can be completed to change the focus associated with the directional display device 110. Modification of the size s of the gap 508 can also be used to vary the relative or perceived width of the various viewpoints associated with the composite content 108, if desired, by modifying projection of the view lines 504, as explained above with reference to FIG. 5C.

From operation 610, the process 600 proceeds to operation 612 (display modified content), wherein the control system 102 outputs the modified composite content 108 for display at the directional display device 110. As explained above with reference to operation 606, operation 612 can include determining what content 106 is to be displayed, dividing or sectioning the various instances of content 106 into divisions or sections, shifting or adjusting sections or divisions of the content 106, adding blocking pixels and/or other information and the divisions or sections of the content 106 into the composite content 108 and/or modifying the contents of the composite content 108.

After operation 608, the process 600 may repeat (e.g., periodically, continuously, or on demand as needed) or terminate. If the process 600 repeats, the process can return to operation 608, wherein the control system 102 again determines if a change in one or more of the viewpoints has occurred.

Figure 7:
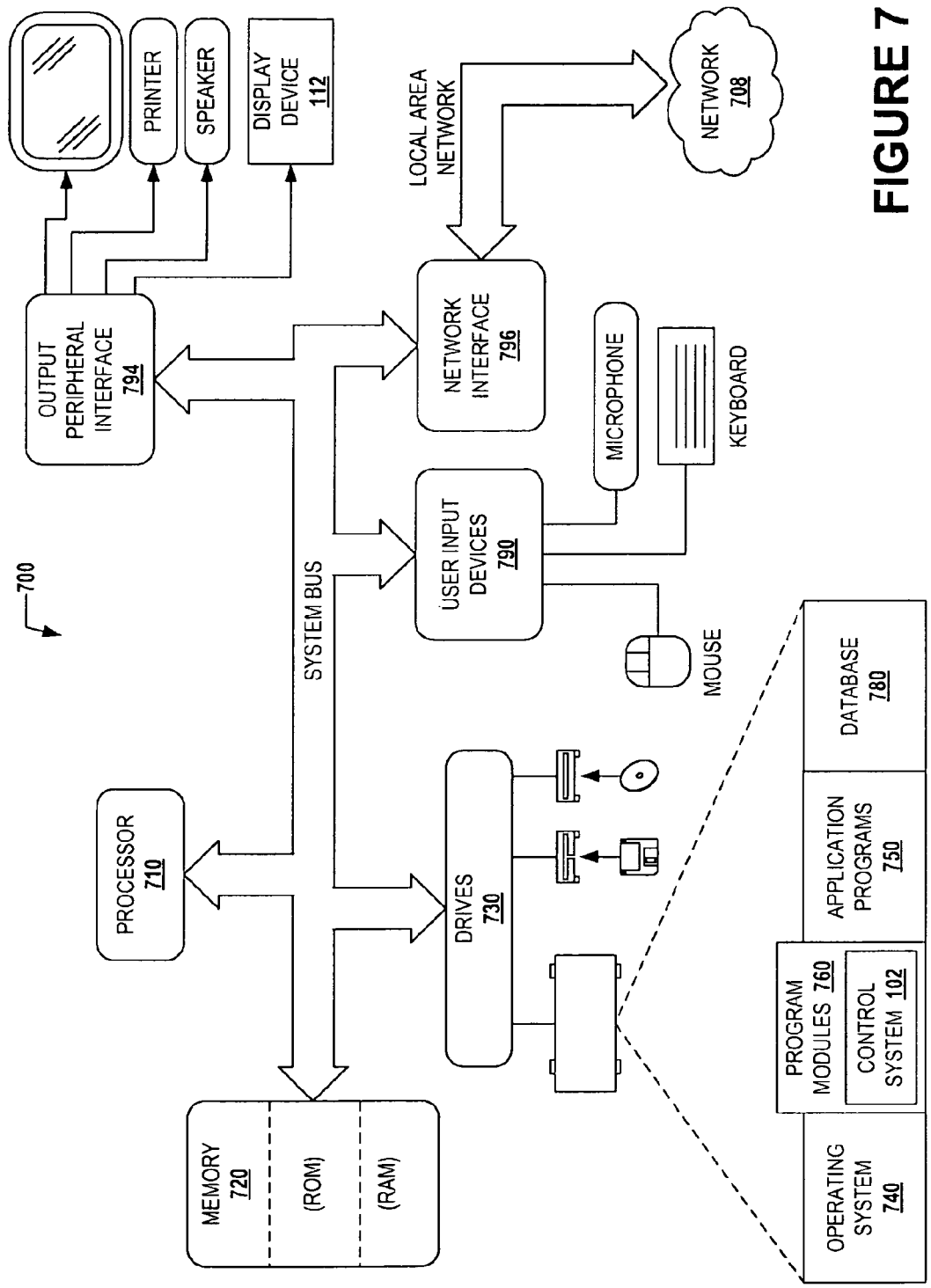
FIG. 7 is a block diagram illustrating an example computer capable of displaying composite content on a directional display device.

FIG. 7 is a block diagram illustrating an example computer 700 capable of displaying composite content on a directional display device arranged according to at least some embodiments presented herein. As depicted, the computer 700 includes a processor 710, a memory 720 and one or more drives 730. The computer 700 may be implemented as a conventional computer system, an embedded control computer, a laptop, or a server computer, a mobile device, an STB, a kiosk, a vehicular information system, a mobile telephone, a customized machine, or other hardware platform.

The drives 730 and their associated computer storage media, provide storage of computer readable instructions, data structures, program modules and other data for the computer 700. The drives 730 can include an operating system 740, application programs 750, program modules 760, and a database 780. The program modules 760 may include a control system 102. The control system 102 may be adapted to execute the process 600 for displaying composite content on a directional display device as described in greater detail above (e.g., see previous description with respect to one or more of FIGS. 1-6). The computer 700 further includes user input devices 790 through which a user may enter commands and data. The input devices 790 can include one or more of an electronic digitizer, a microphone, a keyboard and pointing device, commonly referred to as a mouse, trackball or touch pad. Other input devices may include a joystick, game pad, satellite dish, scanner, other devices, or the like.

These and other input devices can be coupled to the processor 710 through a user input interface that is coupled to a system bus, but may be coupled by other interface and bus structures, such as a parallel port, game port or a universal serial bus ("USB"). Computers such as the computer 700 also may include other peripheral output devices such as speakers, printers, displays, directional display devices 110, and/or other devices, which may be coupled through an output peripheral interface 794 or the like.

The computer 700 may operate in a networked environment using logical connections to one or more computers, such as a remote computer (not illustrated), directional display devices 110, and/or other devices operating on or in communication with a network 708 coupled to a network interface 796. The remote computer may be a personal computer, a server, a router, a network PC, a peer device or other common network node, and can include many or all of the elements described above relative to the computer 700. Networking environments are commonplace in offices, enterprise-wide area networks ("WAN"), local area networks ("LAN"), intranets, and the Internet.

When used in a LAN or WLAN networking environment, the computer 700 may be coupled to the LAN through the network interface 796 or an adapter. When used in a WAN networking environment, the computer 700 typically includes a modem or other means for establishing communications over the WAN, such as the Internet or the network 708. The WAN may include the Internet, the illustrated network 708, various other networks, or any combination thereof. It will be appreciated that other mechanisms of establishing a communications link, ring, mesh, bus, cloud, or network between the computers may be used.

According to some embodiments, the computer 700 may be coupled to a networking environment. The computer 700 may include one or more instances of a physical computer-readable storage medium or media associated with the drives 730 or other storage devices. The system bus may enable the processor 710 to read code and/or data to/from the computer storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 720, whether characterized as RAM, ROM, flash, or other types of volatile or nonvolatile memory technology. The media may also represent secondary storage, whether implemented as the storage drives 730 or otherwise. Hard drive implementations may be characterized as solid state, or may include rotating media storing magnetically-encoded information.

The storage media may include one or more program modules 760. The program modules 760 may include software instructions that, when loaded into the processor 710 and executed, transform a general-purpose computing system into a special-purpose computing system. As detailed throughout this description, the program modules 760 may provide various tools or techniques by which the computer 700 may participate within the overall systems or operating environments using the components, logic flows, and/or data structures discussed herein.

The processor 710 may be constructed from any number of transistors or other circuit elements, which may individually or collectively assume any number of states. More specifically, the processor 710 may operate as a state machine or finite-state machine. Such a machine may be transformed to a second machine, or specific machine by loading executable instructions contained within the program modules 760. These computer-executable instructions may transform the processor 710 by specifying how the processor 710 transitions between states, thereby transforming the transistors or other circuit elements constituting the processor 710 from a first machine to a second machine. The states of either machine may also be transformed by receiving input from the one or more user input devices 790, the network interface 796, other peripherals, other interfaces, or one or more users or other actors. Either machine may also transform states, or various physical characteristics of various output devices such as printers, speakers, video displays, or otherwise.

Encoding the program modules 760 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, or the like. For example, if the storage media are implemented as semiconductor-based memory, the program modules 760 may transform the physical state of the semiconductor memory 720 when the software is encoded therein. For example, the software may transform the state of transistors, capacitors, or other discrete circuit elements constituting the semiconductor memory 720.

As another example, the storage media may be implemented using magnetic or optical technology such as drives 730. In such implementations, the program modules 760 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description. As used in the claims, the phrase "computer storage medium," and variations thereof, does not include waves, signals, and/or other transitory and/or intangible communication media, per se.

Figure 8:
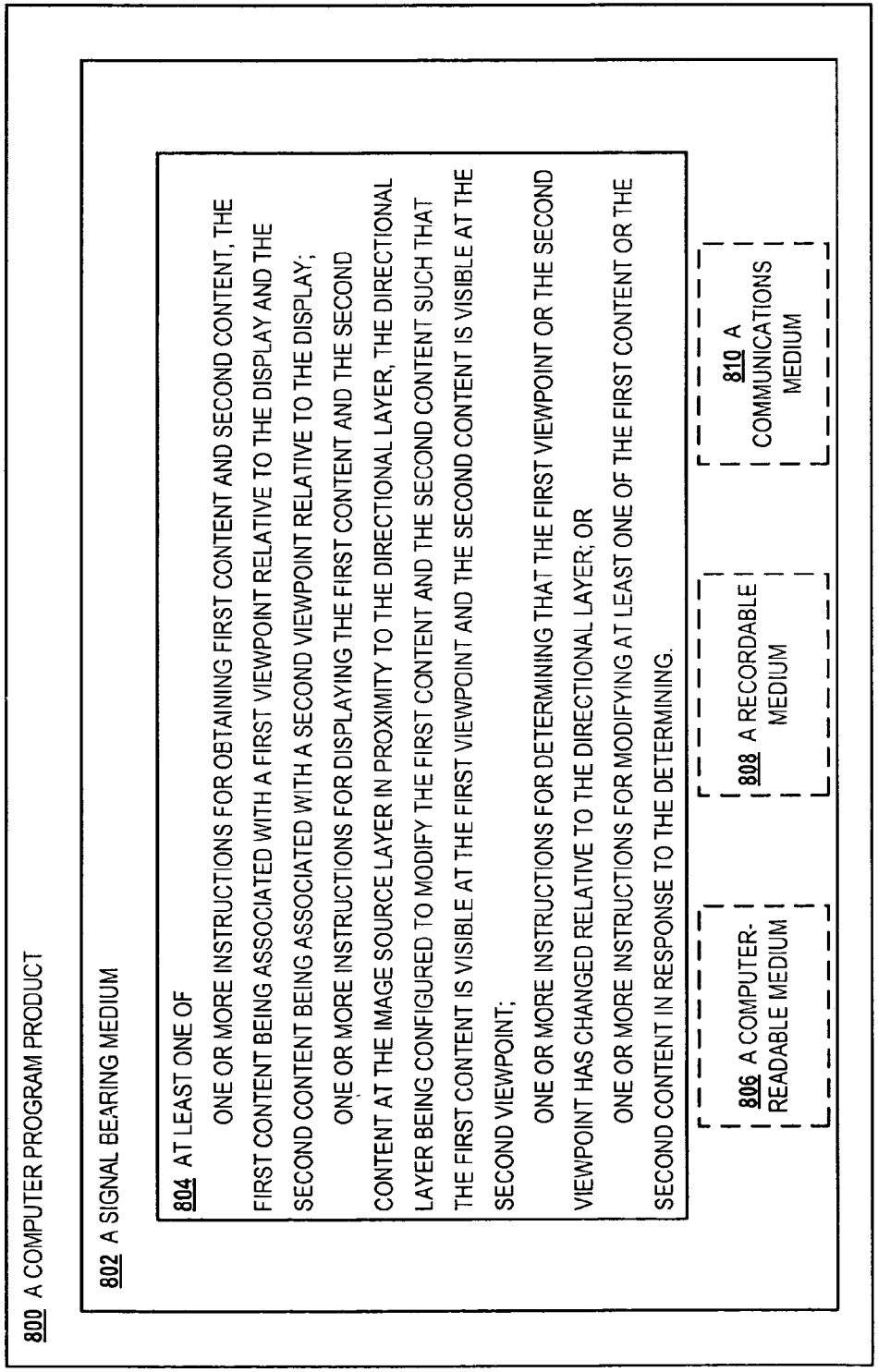
FIG. 8 is a schematic diagram illustrating computer program products for displaying composite content on a directional display device, all arranged according to at least some embodiments presented herein.

FIG. 8 is a schematic diagram illustrating computer program products 800 for displaying composite content on a directional display device arranged according to at least some embodiments presented herein. An illustrative embodiment of the example computer program product 800 is provided using a signal bearing medium 802, and may include at least one instruction 804. The at least one instruction 804 may include: one or more instructions for obtaining first content and second content, the first content being associated with a first viewpoint relative to the display and the second content being associated with a second viewpoint relative to the display; one or more instructions for displaying the first content and the second content at the image source layer in proximity to the directional layer, the directional layer being configured to modify the first content and the second content such that the first content is visible at the first viewpoint and the second content is visible at the second viewpoint; one or more instructions for determining that the first viewpoint or the second viewpoint has changed relative to the directional layer; or one or more instructions for modifying at least one of the first content or the second content in response to the determining. In some embodiments, the signal bearing medium 802 of the one or more computer program products 800 include a computer readable medium 806, a recordable medium 808, and/or a communications medium 810.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

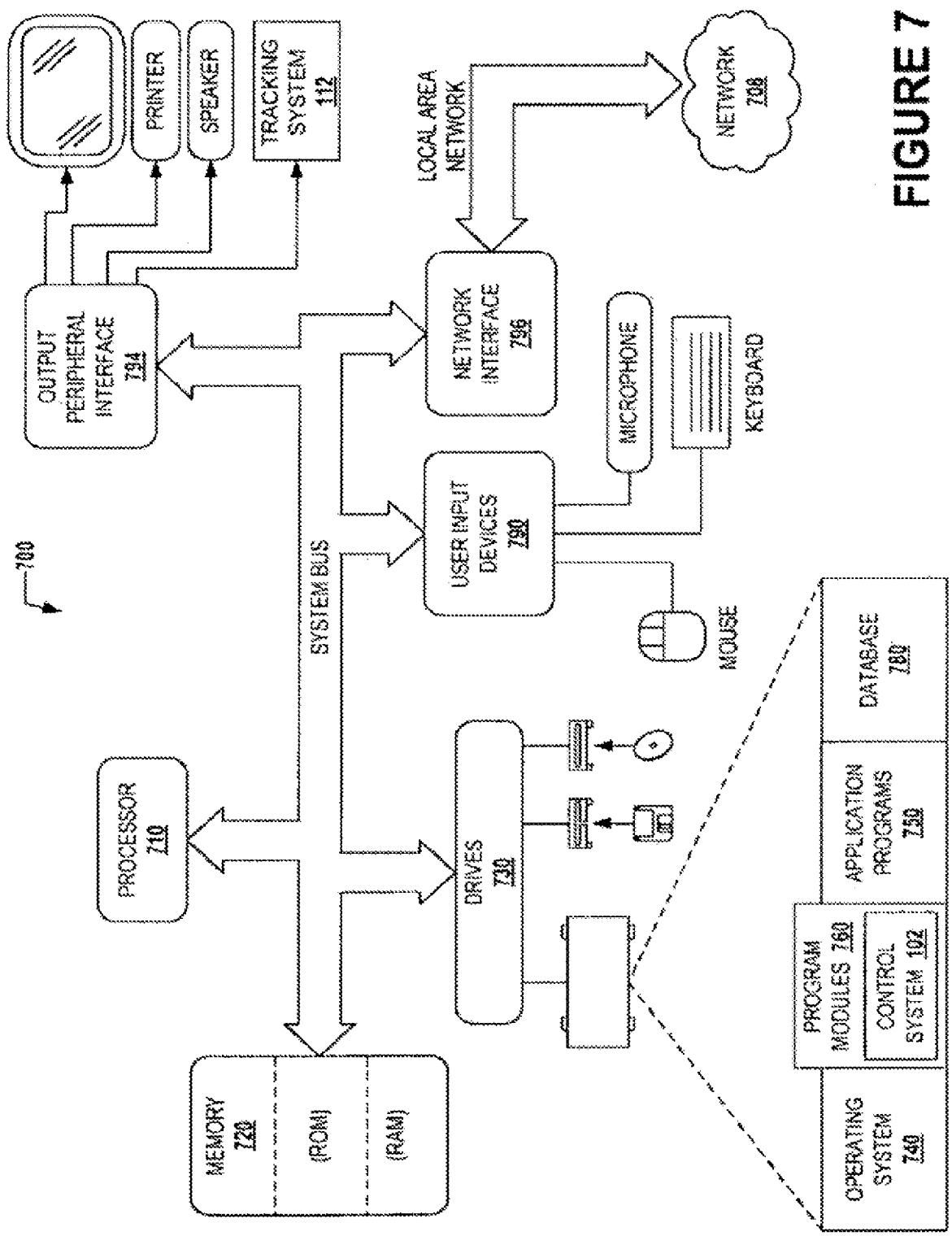

I claim:

1. A computer-implemented method for displaying first content and second content on a display comprising an image source layer and a directional layer, the computer-implemented method comprising computer-implemented operations for:
   obtaining:
      the first content directed to a first viewpoint of a first viewer, the first viewer identified to view the first content, and
      the second content directed to a second viewpoint of a second viewer, the second viewer identified to view the second content,
      the first content comprising a first video transmitted from a first content source, and
         the second content comprising a second video, different from the first video, transmitted from a second content source, different from the first content source;
   displaying the first content and the second content at the image source layer adjacent to the directional layer such that the first content is visible at the first viewpoint and the second content is visible at the second viewpoint; determining that the first viewpoint or the second viewpoint has changed relative to the display;
   modifying at least one of the first content or the second content displayed in response to the determining so that a width of the first content perceived through the directional layer at the first viewpoint and a width of the second content perceived through the directional layer at the second viewpoint are substantially equal to one another; and
   adjusting a gap between the image source layer and the directional layer in response to the determining,
   wherein the first content is updated at a first refresh rate and the second content is updated at a second refresh rate that is different from the first refresh rate such that the first content is visible at the first viewpoint and the second content is visible at the second viewpoint.

2. The method of claim 1, further comprising displaying a blocking pixel at the image source layer adjacent to at least one of the first content or the second content.

3. The method of claim 2, wherein the blocking pixel is visible at a third viewpoint, and wherein the first content and the second content are not visible at the third viewpoint.

4. The method of claim 1, wherein the display has a width and a height, and wherein the directional layer comprises a lenticular element to direct the first content to the first viewpoint and the second content to the second viewpoint, and wherein the first viewpoint and the second viewpoint differ based, at least partially, upon a viewing angle relative to the width of the display.

5. The method of claim 1, wherein the display has a width and a height, and wherein the directional layer comprises a lenticular element to direct the first content to the first viewpoint and the second content to the second viewpoint, and wherein the first viewpoint and the second viewpoint differ based, at least partially, upon a viewing angle relative to the height of the display.

6. The method of claim 1, wherein the display has a width and a height, and wherein the directional layer comprises a lenticular element to direct the first content to the first viewpoint and the second content to the second viewpoint, and wherein the first viewpoint and the second viewpoint differ based, at least partially, upon a first viewing angle relative to the width of the display and upon a second viewing angle relative to the height of the display.

7. The method of claim 1, further comprising associating the first viewer with the first content and the second content with the second content.

8. The method of claim 7, wherein determining that the first viewpoint or the second viewpoint has changed comprises monitoring movement of the first viewer and the second viewer.

9. The method of claim 8, further comprising modifying at least one of the first content or the second content displayed in response to determining that the first viewpoint or the second viewpoint has changed.

10. The method of claim 8, wherein monitoring movement of the first viewer and the second viewer comprises associating a device with the entity and monitoring the device to track movement of the device.

11. An apparatus configured to display first content and second content, the apparatus comprising:
   an image source layer to display:
      the first content that is directed to a first viewpoint of a first group of viewers identified to view the first content and that is received from a first content source, and
      the second content that is directed to a second viewpoint of a second group of viewers identified to view the second content that is received from a second content source different from the first content source and is a different type of content from the first content;
   a directional layer adjacent to the image source layer, the directional layer comprising a lenticular element to direct the first content to the first viewpoint and the second content to the second viewpoint;
   a tracking system to determine that the first viewpoint or the second viewpoint has changed relative to the display; and
   a control system to obtain the first content and the second content, modify at least one of the first content or the second content in response to the determination that the first viewpoint or the second viewpoint has changed relative to the display so that a width of the first content perceived through the directional layer at the first viewpoint and a width of the second content perceived through the directional layer at the second viewpoint are substantially equal to one another and adjust a gap between the image source layer and the directional layer in response to the determination that the first viewpoint or the second viewpoint has changed relative to the display,
   wherein the first content is updated at a first refresh rate and the second content is updated at a second refresh rate that is different from the first refresh rate such that the first content is visible at the first viewpoint and the second content is visible at the second viewpoint.

12. The apparatus of claim 11, wherein the control system is further to output to the image source layer the first content, the second content, and a blocking pixel adjacent to at least one of the first content or the second content.

13. The apparatus of claim 12, wherein the blocking pixel is visible at a third viewpoint, and wherein the first content and the second content are not visible at the third viewpoint.

14. The apparatus of claim 11, wherein the display has a width and a height, and wherein the first viewpoint and the second viewpoint differ based, at least partially, upon at least one of a first viewing angle relative to the width of the display or a second viewing angle relative to the height of the display.

15. The apparatus of claim 11, wherein the control system is further to associate an entity with the first content or the second content.

16. The apparatus of claim 15, wherein the tracking system is to track movement of the entity and determine that the entity has moved.

17. The apparatus of claim 16, wherein the tracking system is to modify at least one of the first content or the second content displayed in response to determining that the entity has moved.

18. The apparatus of claim 17, wherein the tracking system is to monitor the entity by association of a device with the entity and monitors the device to track movement of the device.

19. The apparatus of claim 18, wherein the tracking system comprises a short range communication device, and wherein the tracking system is to communicate with the device via the short range communication device.

20. The apparatus of claim 17, wherein the tracking system comprises an optical sensor, and wherein the tracking system is to track movement of the entity with the optical sensor.

21. A non-transitory computer storage medium having computer-executable instructions stored thereon that, when executed by a control system of a display comprising the control system, an image source layer, and a directional layer, causes the control system to:
   obtain:
      first content directed to a first viewpoint of a first viewer, the first viewer identified to view the first content,
      second content that is a different type of content from the first content and is directed to a second viewpoint of a second viewer, the second viewer identified to view the second content, and
      third content that is a different type of content from the first content and the second content,
      the first content being transmitted from a first content source, the second content being transmitted from a second content source that is different from the first content source and the third content being transmitted from a third content source that is different from the first content source and the second content source;
   display the first content, the second content and the third content at the image source layer in proximity to the directional layer, the directional layer being configured to modify the first content, the second content and the third content such that the first content is visible at the first viewpoint, the second content is visible at the second viewpoint and the third content is visible at the third viewpoint;

determine that the first viewpoint, the second viewpoint or the third viewpoint has changed relative to the directional layer;

modify at least one of the first content, the second content or the third content displayed at the image source layer in response to the determining so that width of the first content perceived through the directional layer at the first viewpoint, a width of the second content perceived through the directional layer at the second viewpoint and a width of the third content perceived through the directional layer at the third viewpoint are substantially equal to each another; and adjust a gap between the image source layer and the directional layer in response to the determining, wherein the first content is updated at a first refresh rate, the second content is updated at a second refresh rate that is different from the first refresh rate and the third content is updated at a third refresh rate that is different from the first refresh rate and the second refresh, such that the first content is visible at the first viewpoint, the second content is visible at the second viewpoint, and the third content is visible at the third viewpoint.

22. The computer storage medium of claim 21, further comprising computer-executable instructions that, when executed by the control system, cause the control system to display a blocking pixel at the image source layer adjacent to at least one of the first content or the second content, wherein the blocking pixel is visible from the third viewpoint, and wherein the first content and the second content are not visible at the third viewpoint.

23. The computer storage medium of claim 21, further comprising computer-executable instructions that, when executed by the control system, cause the control system to associate an entity with the first content, the second content or the third content.

24. The computer storage medium of claim 23, wherein determining that the first viewpoint, the second viewpoint or the third viewpoint has changed comprises monitoring the entity to track movement of the entity and determining that the entity has moved.

25. The computer storage medium of claim 24, further comprising computer-executable instructions that, when executed by the control system, cause the control system to modify at least one of the first content, the second content or the third content displayed in response to determining that the entity has moved.

26. A computer-implemented method for displaying first content and second content on a display comprising an image source layer and a directional layer, the computer-implemented method comprising computer-implemented operations for:

obtaining:
the first content directed to a first viewpoint of a first viewer, the first viewer identified to view the first content, and
the second content directed to a second viewpoint of a second viewer, the second viewer identified to view the second content,
the first content comprising a first video transmitted from a first content source, and
the second content comprising a second video, different from the first video, transmitted from a second content source, different from the first content source;

displaying the first content and the second content at the image source layer adjacent to the directional layer such that the first content is visible at the first viewpoint and the second content is visible at the second viewpoint; determining that the first viewpoint or the second viewpoint has changed relative to the display;

modifying at least one of the first content or the second content displayed in response to the determining so that a width of the first content perceived through the directional layer at the first viewpoint and a width of the second content perceived through the directional layer at the second viewpoint are substantially equal to one another, wherein the first content is updated at a first refresh rate and the second content is updated at a second refresh rate that is different from the first refresh rate such that the first content is visible at the first viewpoint and the second content is visible at the second viewpoint, and the directional layer comprises at least two facets and the at least two facets provide at least one linear edge used to define a division between the first viewpoint and the second viewpoint.

* * * * *

UNITED STATES PATENT AND TRADEMARK OFFICE
CERTIFICATE OF CORRECTION

Page 1 of 3

PATENT NO. : 9,491,445 B2
APPLICATION NO. : 13/263417
DATED : November 8, 2016
INVENTOR(S) : Ehrlacher It is certified that error appears in the above-identified patent and that said Letters Patent is hereby corrected as shown below:

In Fig. 7, Sheet 10 of 11, delete "DISPLAY DEVICE 112" and insert -- TRACKING SYSTEM 112 --, therefor. (See attached sheet.)

In Fig. 8, Sheet 11 of 11, for Tag "806", Lines 1-2, delete "A COMPUTER-READABLE MEDIUM" and insert -- A COMPUTER READABLE MEDIUM --, therefor.

In Column 1, below Title, Line 1, insert -- CROSS-REFERENCE TO RELATED APPLICATION The application is a U.S. National Stage filing under 35 U.S.C. § 371 of International Application No. PCT/US2011/035339, filed on May 5, 2011. --.

In Column 3, Lines 49-50, delete "computer program products" and insert -- a computer program product --, therefor.

In Column 7, Line 1, delete "viewers 414" and insert -- viewers 114 --, therefor.

In Column 8, Line 18, delete "views 114" and insert -- viewers 114 --, therefor.

In Column 10, Line 9, delete "instead of" and insert -- instead of, --, therefor.

In Column 10, Line 48, delete "display device 110" and insert -- directional display device 110 --, therefor.

In Column 11, Line 22, delete "400D;" and insert -- 400D, --, therefor.

In Column 11, Line 27, delete "400R;" and insert -- 400R, --, therefor.

In Column 13, Line 42, delete "504A-E" and insert -- 504A-F --, therefor.

In Column 13, Line 65, delete "view lines 502" and insert -- view lines 504 --, therefor.

Signed and Sealed this
Second Day of May, 2017

Michelle K. Lee
*Director of the United States Patent and Trademark Office*

In Column 14, Line 6, delete "504E" and insert -- 504F --, therefor.

In Column 17, Line 9, delete "60U" and insert -- 600 --, therefor.

In Column 18, Line 24, delete "input devices 790" and insert -- user input devices 790 --, therefor.

In Column 20, Lines 7-8, delete "computer program products" and insert -- a computer program product --, therefor.

In Column 20, Line 30, delete "computer program products" and insert -- a computer program product --, therefor.

In Column 25, Line 24, in Claim 22, delete "The" and insert -- The non-transitory --, therefor.

In Column 25, Line 32, in Claim 23, delete "The" and insert -- The non-transitory --, therefor.

In Column 25, Line 37, in Claim 24, delete "The" and insert -- The non-transitory --, therefor.

In Column 25, Line 42, in Claim 25, delete "The" and insert -- The non-transitory --, therefor.